United States Patent
He et al.

(10) Patent No.: US 12,160,585 B2
(45) Date of Patent: Dec. 3, 2024

(54) DATA PROCESSING METHOD AND APPARATUS

(71) Applicant: Tencent Technology (Shenzhen) Company Limited, Guangdong (CN)

(72) Inventors: Zhaoliang He, Guangdong (CN); Hong Zhang, Guangdong (CN); Chenchen Gu, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 80 days.

(21) Appl. No.: 18/135,910

(22) Filed: Apr. 18, 2023

(65) Prior Publication Data

US 2023/0262230 A1 Aug. 17, 2023

Related U.S. Application Data

(63) Continuation of application No. PCT/CN2022/101165, filed on Jun. 24, 2022.

(30) Foreign Application Priority Data

Aug. 5, 2021 (CN) .......................... 202110898283.6

(51) Int. Cl.
*H04N 19/147* (2014.01)
*H04N 19/119* (2014.01)
(Continued)

(52) U.S. Cl.
CPC ......... *H04N 19/147* (2014.11); *H04N 19/119* (2014.11); *H04N 19/124* (2014.11);
(Continued)

(58) Field of Classification Search
CPC .. H04N 19/147; H04N 19/119; H04N 19/124; H04N 19/13; H04N 19/149;
(Continued)

(56) References Cited

U.S. PATENT DOCUMENTS

2020/0244995 A1 7/2020 Hsiang

FOREIGN PATENT DOCUMENTS

| CN | 1297623 | 5/2001 |
|---|---|---|
| CN | 112352429 | 2/2021 |

(Continued)

OTHER PUBLICATIONS

Chen et al., Fast Rate Distortion Optimization with Adaptive Context Group Modeling for HEVC, IEEE 2017.*
(Continued)

*Primary Examiner* — Shadan E Haghani
(74) *Attorney, Agent, or Firm* — Crowell & Moring LLP

(57) ABSTRACT

Embodiments of this disclosure provide a data processing method and apparatus. The method includes: acquiring M candidate quantized state chains of a transform block in multimedia data; acquiring N syntax elements corresponding to a transform coefficient i in the transform block, and acquiring fixed probability models respectively corresponding to K syntax elements; performing context modeling for (N-K) syntax elements according to adjacent coding coefficients of the transform coefficient i, to obtain target probability models respectively corresponding to the (N-K) syntax elements; determining a coefficient rate distortion cost of the transform coefficient i according to the fixed probability models, the target probability models, and a quantization reconstruction value of the transform coefficient i; and determining path rate distortion costs respectively corresponding to the M candidate quantized state chains according to a coefficient rate distortion cost of each transform coefficient.

20 Claims, 7 Drawing Sheets

(51) Int. Cl.
*H04N 19/124* (2014.01)
*H04N 19/13* (2014.01)
*H04N 19/149* (2014.01)
*H04N 19/172* (2014.01)
*H04N 19/176* (2014.01)
*H04N 19/18* (2014.01)
*H04N 19/60* (2014.01)
*H04N 19/70* (2014.01)

(52) U.S. Cl.
CPC ........... *H04N 19/13* (2014.11); *H04N 19/149* (2014.11); *H04N 19/172* (2014.11); *H04N 19/176* (2014.11); *H04N 19/18* (2014.11); *H04N 19/60* (2014.11); *H04N 19/70* (2014.11)

(58) Field of Classification Search
CPC .... H04N 19/172; H04N 19/176; H04N 19/18; H04N 19/60; H04N 19/70; H04N 19/91
See application file for complete search history.

(56) References Cited

FOREIGN PATENT DOCUMENTS

| | | |
|---|---|---|
| CN | 112640448 | 4/2021 |
| CN | 112956205 | 6/2021 |
| CN | 113170132 | 7/2021 |
| CN | 113170137 | 7/2021 |
| WO | WO2020/185530 | 9/2020 |

OTHER PUBLICATIONS

Wei et al., VVC Fast Bitrate Estimation Algorithm Based on Statistical Modeling, Telecommunications Science, 2022.*
International Search Report issued Sep. 28, 2022 in International (PCT) Application No. PCT/CN2022/101165.

* cited by examiner

DATA PROCESSING METHOD AND APPARATUS

RELATED APPLICATION

This application is a continuation application of PCT Patent Application No. PCT/CN2022/101165, filed on Jun. 24, 2022, which claims priority to Chinese Patent Application No. 2021108982836, filed on Aug. 5, 2021, wherein the content of the above-referenced applications is incorporated herein by reference in its entirety.

FIELD OF THE TECHNOLOGY

This disclosure relates to the field of computer technologies and multimedia coding and decoding technologies, and in particular, to a data processing method and apparatus, a computer device, a computer-readable storage medium and a computer program product.

BACKGROUND OF THE DISCLOSURE

Quantization is a core process of multimedia data (for example, videos, audios, images, etc.) coding technology. As a quantization method in multimedia data coding technology, Dependent Quantization (DQ) can achieve compression of multimedia data to improve coding efficiency. In the related art, in dependent quantization, during calculation of a rate distortion cost, context modeling needs to be performed for all syntax elements in a data block of multimedia data, which consumes a lot of calculation resources, thereby causing the calculation speed of the rate distortion cost to be too low.

SUMMARY

Embodiments of this disclosure provide a data processing method and apparatus, a computer device, a computer-readable storage medium and a computer program product, which can reduce context modeling and improve the calculation speed of a rate distortion cost.

Embodiments of this disclosure provide a data processing method, including:
acquiring M candidate quantized state chains of a transform block in multimedia data, the M candidate quantized state chains being determined according to a quantized state of a transform coefficient in the transform block, and M being a positive integer;
acquiring N syntax elements corresponding to a transform coefficient i in the transform block, and acquiring fixed probability models respectively corresponding to K syntax elements among the N syntax elements, i being less than or equal to a quantity of transform coefficients in the transform block, i, N and K being all positive integers, and K being less than N;
performing context modeling for (N-K) syntax elements according to adjacent coding coefficients of the transform coefficient i, to obtain target probability models respectively corresponding to the (N-K) syntax elements;
determining a coefficient rate distortion cost of the transform coefficient i according to pre-coding results of pre-coding the K syntax elements with the fixed probability models, pre-coding results of pre-coding the (N-K) syntax elements with the target probability models, and a quantization reconstruction value corresponding to the transform coefficient i; and
determining path rate distortion costs respectively corresponding to the M candidate quantized state chains according to a coefficient rate distortion cost of the transform coefficient in the transform block.

Embodiments of this disclosure provide a data processing method, including:
acquiring M candidate quantized state chains of a transform block in multimedia data, the M candidate quantized state chains being determined according to a quantized state of a transform coefficient in the transform block, and M being a positive integer;
acquiring N syntax elements corresponding to a transform coefficient i in the transform block, and acquiring fixed probability models respectively corresponding to the N syntax elements, i being less than or equal to a quantity of transform coefficients in the transform block, and i and N being positive integers;
determining a coefficient rate distortion cost of the transform coefficient i according to pre-coding results of pre-coding the N syntax elements with the fixed probability models and a quantization reconstruction value corresponding to the transform coefficient i; and
determining path rate distortion costs respectively corresponding to the M candidate quantized state chains according to a coefficient rate distortion cost of the transform coefficient in the transform block.

Embodiments of this disclosure provide a data processing apparatus, including a memory operable to store computer-readable instructions and a processor circuitry operable to read the computer-readable instructions. When executing the computer-readable instructions, the processor circuitry is configured to:
acquire M candidate quantized state chains of a transform block in multimedia data, the M candidate quantized state chains being determined according to a quantized state of a transform coefficient in the transform block, and M being a positive integer;
acquire N syntax elements corresponding to a transform coefficient i in the transform block, and acquire fixed probability models respectively corresponding to K syntax elements among the N syntax elements, i being less than or equal to a quantity of transform coefficients in the transform block, i, N and K being all positive integers, and K being less than N;
perform context modeling for (N-K) syntax elements according to adjacent coding coefficients of the transform coefficient i, to obtain target probability models respectively corresponding to the (N-K) syntax elements;
determine a coefficient rate distortion cost of the transform coefficient i according to pre-coding results of pre-coding the K syntax elements with the fixed probability models, pre-coding results of pre-coding the (N-K) syntax elements with the target probability models, and a quantization reconstruction value corresponding to the transform coefficient i; and
determine path rate distortion costs respectively corresponding to the M candidate quantized state chains according to a coefficient rate distortion cost of the transform coefficient in the transform block.

Embodiments of this disclosure provide a computer device, including a memory and a processor, the memory being connected to the processor, where the memory is configured to store a computer program, and the processor is configured to invoke the computer program to cause the computer device to perform the data processing method provided by the embodiments of this disclosure.

Embodiments of this disclosure provide a computer-readable storage medium, the computer-readable storage medium storing a computer program, the computer program being adapted to be loaded and executed by a processor to cause a computer device having the processor to perform the data processing method provided by the embodiments of this disclosure.

Embodiments of this disclosure provide a computer program product or a computer program, the computer program product or the computer program including a computer instruction stored in a computer-readable storage medium. A processor of a computer device reads the computer instruction from a computer-readable storage medium, and the processor executes the computer instruction, so that the computer device executes the data processing method provided by the embodiments of this disclosure.

Embodiments of this disclosure further provide a computer program product, including a computer program or an instruction, the computer program or the instruction being executed by a processor to implement the data processing method provided by the embodiments of this disclosure.

Embodiments of this disclosure have the following beneficial effects:

According to embodiments of this disclosure, in the coding process of multimedia data, N syntax elements corresponding to a transform coefficient i in a transform block included in multimedia data are acquired, and fixed probability models respectively corresponding to K syntax elements among the N syntax elements are acquired; context modeling is performed for the remaining (N-K) syntax elements through adjacent coding coefficients of the transform coefficient i, to obtain target probability models respectively corresponding to the (N-K) syntax elements, and then a coefficient rate distortion cost of the transform coefficient i is determined through the fixed probability models, the target probability models and a quantization reconstruction value corresponding to the transform coefficient i. In this way, since the context modeling is performed for the (N-K) syntax elements, that is, the context modeling is performed for only some of the syntax elements corresponding to the transform coefficient i, the data processing in the context modeling process is reduced, thereby reducing the calculation resources and calculation time of the coefficient rate distortion cost and improving the calculation speed of the rate distortion cost.

DESCRIPTION OF EMBODIMENTS

Figure 1:
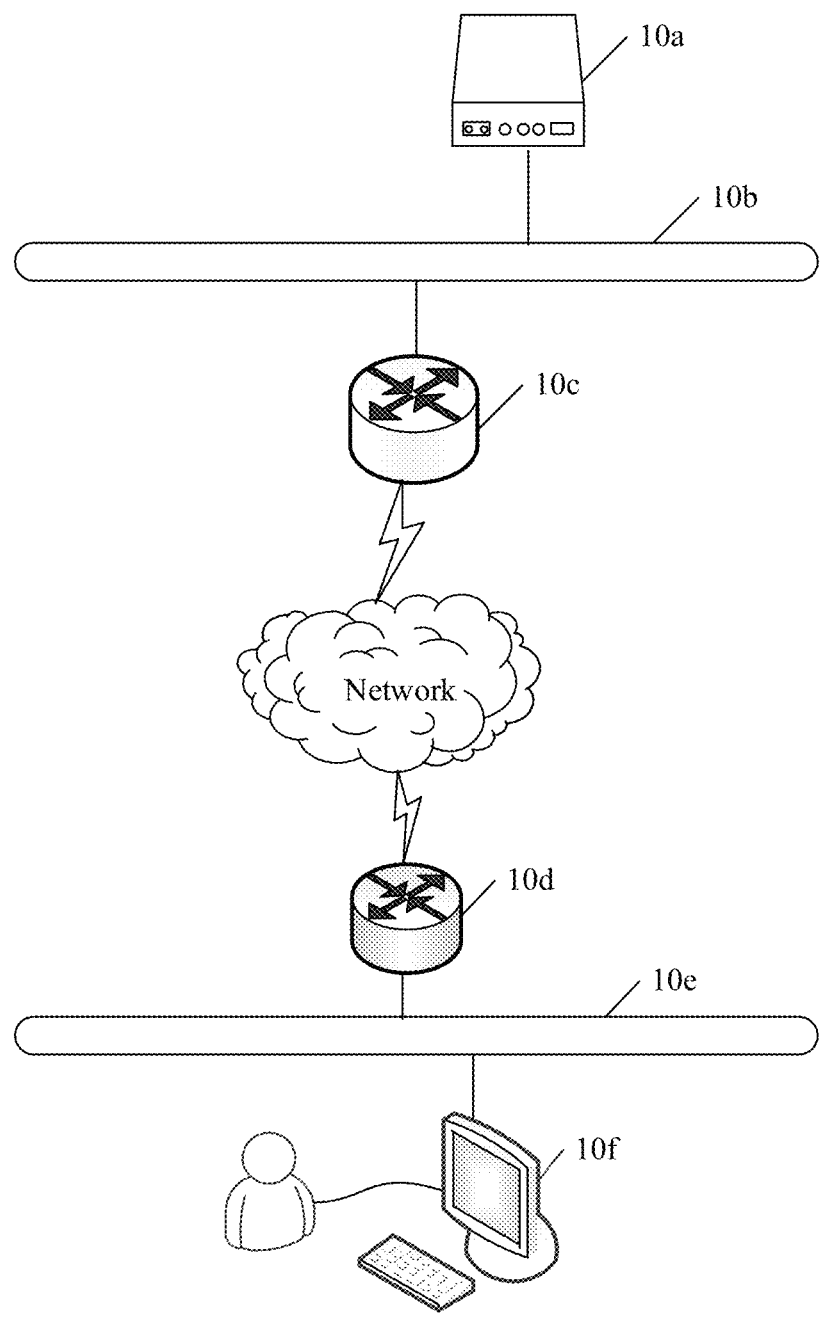
FIG. 1 is a schematic structural diagram of a coding system provided by embodiments of this disclosure.

The technical solutions in embodiments of this disclosure are clearly and completely described below with reference to the accompanying drawings in the embodiments of this disclosure. Apparently, the described embodiments are merely some rather than all of the embodiments of this disclosure. Based on the embodiments of this disclosure, all other embodiments obtained by a person of ordinary skill in the art without involving an inventive effort shall fall within the scope of protection of this disclosure.

This disclosure relates to the following related technical terms:

Versatile Video Coding (VVC): VVC is a new-generation video coding standard. VVC adopts a hybrid coding framework based on a block structure, and integrates intra-frame and inter-frame prediction, transformation, quantization and entropy coding modules. Intra-frame prediction is a spatial domain compression algorithm, in which a current block is predicted by using reconstructed pixels around the current block to remove spatial redundancy between adjacent blocks, thereby achieving more effective compression. Inter-frame prediction is a time domain compression algorithm, in which the purpose of image compression is achieved by using correlation between video frames, that is, time correlation. In order to code a video sequence containing one or more images, one image may be divided into one or more slices, and each slice may include one or more segments. In some embodiments, one segment may be a Coding Unit (CU), a Prediction Unit (PU) and a Transform Unit (TU), where the coding unit is a basic unit for prediction, transformation, quantization and entropy coding, the prediction unit is a basic unit for intra-frame prediction and inter-frame prediction, and the transform block is a basic unit for transformation and quantization. The separation of the above three units makes processing links such as prediction, transformation and coding more flexible, and also makes the division of the links more in line with the texture characteristics of video images, thereby ensuring the optimization of coding performance. In some embodiments, the "block" involved in the embodiments of this disclosure may be used for referring to a pixel region in an image, for example, a color component Y (luminance), or may be used for referring to any one of, for example, a coding unit, a prediction unit, a transform unit, a coefficient grouping, a coding block, a prediction block and a transform block. In addition, "blocks" may also be used for referring to macroblocks and partitions specified in VVC or other video coding, and more generally, the "blocks" may also be used for referring to data arrays of various sizes.

Quantization: there is usually a lot of redundant information in multimedia data (which, for example, may be videos, audios, images, etc.). Therefore, before multimedia data is transmitted, it is necessary to code the multimedia data to remove redundant information of the multimedia data in space, time and other dimensions, so as to improve the transmission efficiency of multimedia data. Quantization is a core process in multimedia data coding processing, and improving quantization efficiency can bring greater performance gain to the coding task of multimedia data. In the field of digital signal processing, quantization may refer to a process of approximating continuous values (or a large number of possible discrete values) of a signal to a finite number (or fewer) of discrete values, such as mapping a single sample in a signal to a fixed value to form a mapping from more to less, so as to achieve the purpose of compression. Quantization may be divided into quantization at a coding side and quantization at a decoding side, where the quantization at the decoding side may be called inverse quantization, and the inverse quantization process at the decoding side may be understood as the reconstruction process corresponding to the quantization at the coding side.

Dependent quantization: a quantization module of VVC adopts a new technology: dependent quantization. Dependent quantization refers to that a set of allowable reconstruction values of transform coefficients in multimedia data depend on the values of the transform coefficient level before a current transform coefficient level in an reconstruction order. Compared with independent quantization, dependent quantization can allow reconstruction vectors to be denser in an X (X herein represents a quantity of transform coefficients contained in a transform block, where X may be a positive integer)-dimensional vector space, which can reduce the average distortion between a current input vector and similar reconstruction vectors. In order to achieve dependent quantization, multiple scalar quantizers with different reconstruction levels may be defined, and the transition between multiple scalar quantizers may be defined. The quantity of scalar quantizers may be determined according to actual needs. For the convenience of description, description is made below by taking two scalar quantizers as examples.

Entropy coding: a quantized transform coefficient may be subjected to entropy coding to output a bit stream. In one or more embodiments, the syntax elements of a quantized transform coefficient may be coded into a bit stream by using Context-based Adaptive Binary Arithmetic Coding (CABAC). Certainly, in the process of entropy coding, coding algorithms, such as Shannon coding, Huffman coding, and run-length coding, other than the CABAC may also be adopted.

FIG. 1 is a schematic structural diagram of a coding system provided by embodiments of this disclosure. As shown in FIG. 1, the coding system may include a coding device 10a, which may be a user terminal or a server configured to code multimedia data, and a decoding device, which may be a user terminal (a user terminal 10f as shown in FIG. 1) or a server configured to receive multimedia. When the coding device 10a and the decoding device (such as the user terminal 10f) are located in different networks, the coding device 10a and the decoding device may be connected through a communication bus and a switch. As shown in FIG. 1, the coding device 10a may be connected to an external decoding device through a communication bus 10b and a switch 10c. Certainly, the network where the decoding device is located may also include a switch 10d and a communication bus 10e, and the decoding device may receive the multimedia data coded by the coding device 10a through the switch 10d and the communication bus 10e in the network. The coding device may transmit the coded multimedia data to the decoding device through a transmission protocol, so that the decoding device decodes the received coded data and displays the decoded multimedia data. The transmission protocol herein may include, but is not limited to: a Dynamic Adaptive Streaming over HTTP (DASH) protocol, an HTTP Live Streaming (HLS) protocol, a Smart Media Transport Protocol (SMTP), and a Transmission Control Protocol (TCP).

The user terminal involved in this disclosure may be smart terminal having a multimedia data coding function, such as a smart phone, a tablet computer, a notebook computer, a vehicle-mounted device, a desktop computer, a smart speaker, and a smart watch. The server involved in this disclosure may be an independent physical server, a server cluster or a distributed system composed of multiple physical servers, or a cloud server providing basic cloud computing services such as a cloud service, a cloud database, cloud computing, a cloud function, cloud storage, a network service, cloud communication, a middleware service, a domain name service, a security service, a Content Delivery Network (CDN), as well as big data and an artificial intelligence platform, which is not limited in this disclosure.

In some embodiments, if the coding system shown in FIG. 1 is applied in a video-on-demand scenario, the coding device 10a is a server providing video-on-demand service to a video-on-demand application, the decoding device may be a user terminal running the video-on-demand application, and the multimedia data at this time may be video on demand. When the user terminal sends a video-on-demand request to the server, the server may acquire the video on demand requested by the user terminal, divide one or more images contained in the video on demand into one or more slices, then compress the video on demand into a bit stream through operations such as prediction, transformation, quantization and entropy coding and send the bit stream to the user terminal. After receiving the bit stream of the video on demand, the user terminal may decode the bit stream of the video on demand to obtain a reconstructed image, and the user terminal may restore the video on demand according to the reconstructed image and play back the video on demand.

In some embodiments, if the coding system shown in FIG. 1 is applied in a video session scenario, the coding device 10a and the decoding device may be two user terminals participating in the video session, for example, the coding device 10a may be a first user terminal initiating the video session and the decoding device may be a second user terminal participating in the video session, and the multimedia data at this time may be session video. The first user terminal may collect the session video, divide one or more images contained in the session video into one or more slices, then compress the session video into a bit stream through operations such as prediction, transformation, quantization and entropy coding and send the bit stream to the second user terminal. After receiving the bit stream of the session video, the second user terminal may decode the bit stream of the session video to obtain a reconstructed image, and the user terminal may restore the session video according to the reconstructed image and play back the session video, thus implementing the video session between the first user terminal and the second user terminal.

Figure 2:
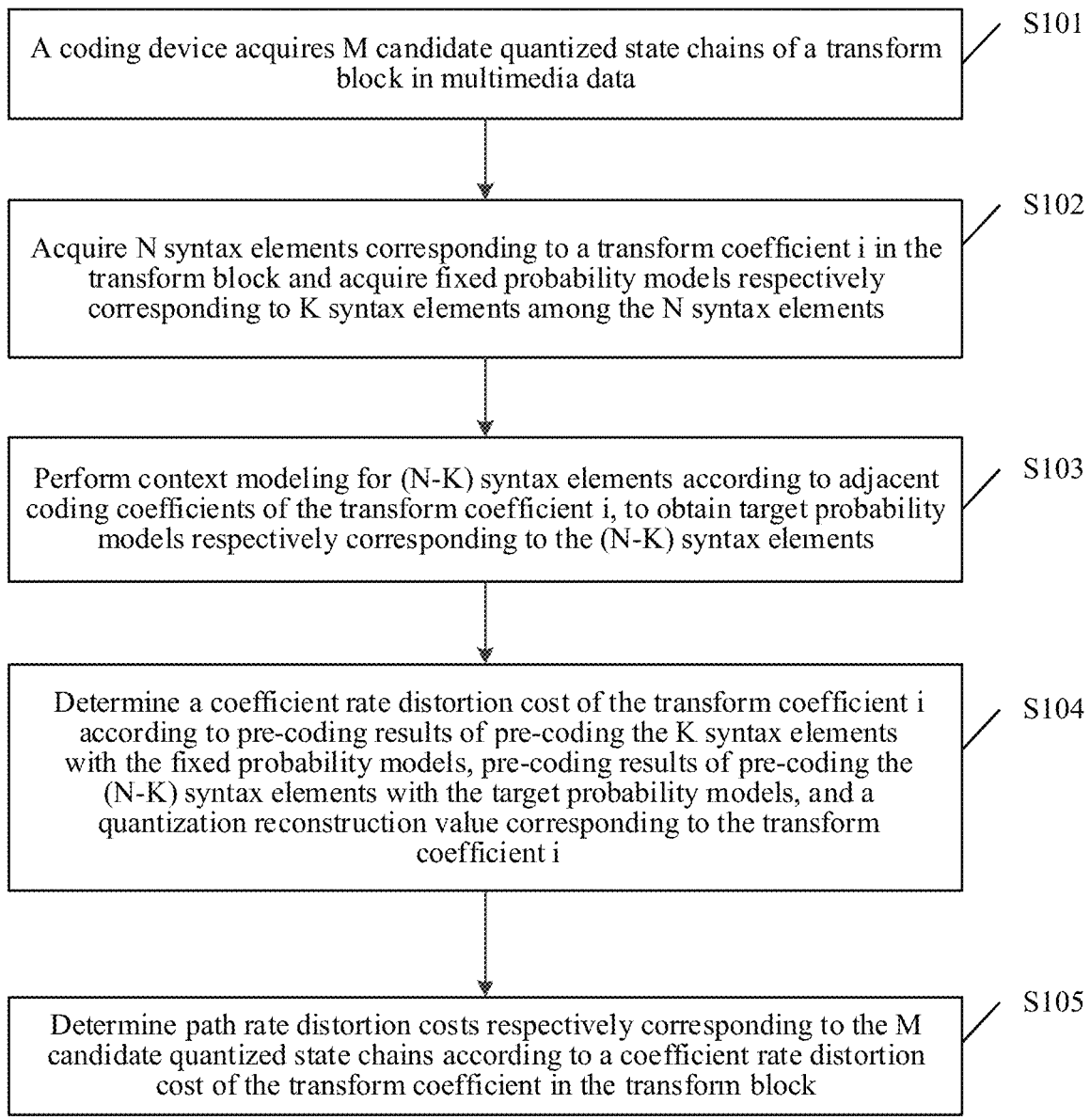
FIG. 2 is a schematic flowchart of a data processing method provided by embodiments of this disclosure.

FIG. 2 is a schematic flowchart of a data processing method provided by embodiments of this disclosure. The data processing method is executed by a coding device in a coding system, where the coding device may be a user terminal, an independent server, a system composed of a user terminal and a server, or a computer program (including a program code). As shown in FIG. 2, the data processing method may include the following steps:

Step S101. The coding device acquires M candidate quantized state chains of a transform block in multimedia data.

Herein, the M candidate quantized state chains are determined according to a quantized state of each transform coefficient in the transform block, and M is a positive integer.

In one or more embodiments, the coding device may directly acquire multimedia data from network resources, or may acquire multimedia data by collecting real-world sound-visual scenes through a capture device. The multimedia data may include video data, audio data, image data, etc. The capture device may refer to a hardware component in the coding device. For example, when the coding device is a user terminal, the capture device may refer to a microphone, a camera and a sensor in the user terminal. The capture device may also refer to a hardware device communicatively connected to the coding device, and the capture device at this time may include an audio device, a camera device and a sensing device. The audio device may include an audio sensor, a microphone, etc. The camera device can include an ordinary camera, a stereo camera, a light field camera, etc. The sensing device may include a laser device, a radar device, etc. In some embodiments, there may be one or more capture devices, and there is one capture device, the capture device may be configured to capture multimedia data content at least one angle in real space. When there are multiple capture devices, the multiple capture devices may be deployed in some specific positions in the real space to capture multimedia data content at different angles in the space at the same time. When the multimedia data includes video data and audio data, the video data content and the audio data content captured by the capture device are synchronized in time and space, and the multimedia data content acquired by the capture device is original data of the multimedia data. For the convenience of description, the coding process of the multimedia data is described below by taking the multimedia data being video data containing one or more video frame images as an example.

In some embodiments, for any video frame image in the multimedia data, in Versatile Video Coding (VVC), one video frame image can be divided into multiple Coding Tree Units (CTU). When the video frame image is a three-channel image frame, one coding tree unit may include coding tree blocks with different color components (for example, one luminance coding block and two chrominance coding tree blocks may be included in the color space YUV), and the sizes of the coding tree units may be the same. In Versatile Video Coding (VVC), one coding tree unit may be divided into multiple coding units (CU) through a quadtree structure, which may also be called a coding tree, that is, the coding tree unit may be a root of a quadtree divided into coding units. One coding unit may be divided into one or more prediction units, and internal samples in one prediction unit may perform prediction by using the same prediction method, and related prediction results may be transmitted to a decoding end by using the prediction unit as the unit. After prediction is performed through the prediction unit and residual information is obtained, one coding unit may also be divided into several Transform Units (TU) through the quadtree structure. In addition to the quadtree structure, the video frame image may also be divided by using other tree structures, such as a binary tree structure and a ternary tree structure.

After the video frame image is divided by the division method, coding tree units, coding units, prediction units and transform units associated with the video frame image may be obtained. One "unit" may include "blocks" of different color components and syntax elements, for example, the coding units may include coding blocks of different color components, and the transform units may include transform blocks of different color components. The above-described division method may also be called unit allocation information of the video frame image. After acquiring the video frame image in the multimedia data, the coding device may divide the video frame image according to the unit allocation information corresponding to the video frame image, to obtain at least two pixel regions. The pixel regions herein may be understood as the above-mentioned "blocks", and the transform block to be quantized may be determined from the at least two pixel regions according to the coding order of the at least two pixel regions.

In some embodiments, after determining the transform block, the coding device may quantize the transform coefficient contained in the transform block through dependent quantization. In order to achieve the dependent quantization, scalar quantizers may include a first quantizer Q0 and a second quantizer Q1. The coding device may acquire a transform coefficient i and transform coefficient (i+1) contained in the transform block, and acquire a quantization value of the transform coefficient i in T quantized states according to the first quantizer Q0 and the second quantizer Q1, where the first quantizer Q0 and the second quantizer Q1 respectively include T/2 quantized states, and T is a positive integer greater than 1. In practical application, the value of T may be determined according to actual situations, for example, the value of T in the embodiments of this disclosure may be 4. Then, a subsequent quantized state corresponding to the quantized state of the transform coefficient i may be determined according to the parity of the quantization value of the transform coefficient i, that is, the next quantized state of the quantized state of the transform coefficient i may be determined as the quantized state of the transform coefficient (i+1), where the subsequent quantized states belong to T quantized states. The M candidate quantized state chains of the transform block are generated according to the quantized state of the transform coefficient i and the quantized state of the transform coefficient (i+1).

One transform block may include multiple transform coefficients, such as a*a transform coefficients, where the value of a*a is greater than or equal to (i+1). The transform coefficient i and the transform coefficient (i+1) are transform coefficients consecutively coded in the transform block. The transform coefficient i is coded before the transform coefficient (i+1), where i is less than or equal to the quantity of the transform coefficients, and i is a positive integer. Each transform coefficient in the transform block may correspond to T quantized states. M candidate quantized state quantities of the transform block may be generated through the T quantized states corresponding to each transform coefficient in the transform block and the state transition between the first quantizer Q0 and the second quantizer Q1, where M may be a positive integer, such as 8, 9, 10, etc.

The generation process of the M candidate quantized state chains will be described below through FIG. 3 to FIG. 5. The generation process of the M candidate quantized state chains is associated with a quantization rule of and the state transition relation between two scalar quantizers defined by the dependent quantization.

Figure 3:
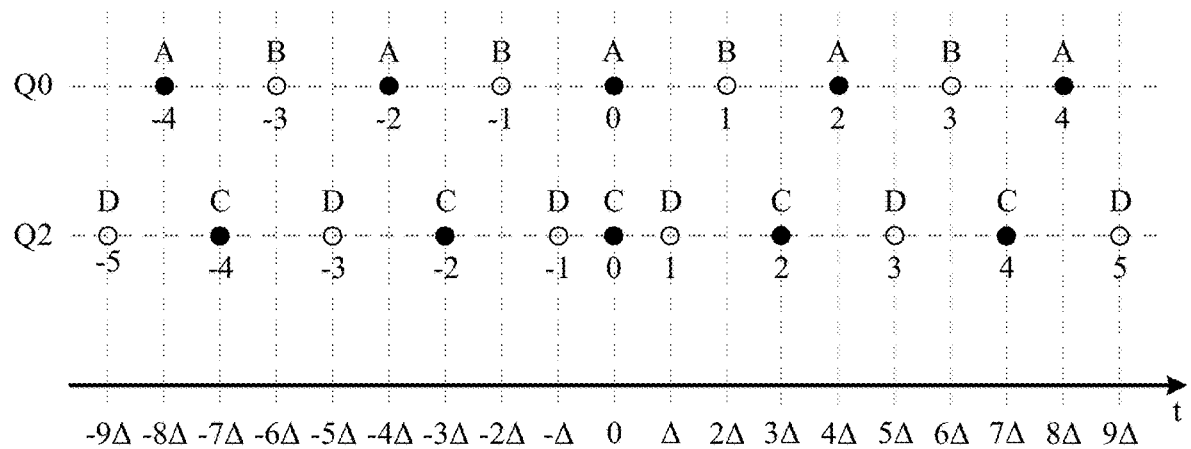
FIG. 3 is a schematic diagram of a quantization rule of two scalar quantizers provided by embodiments of this disclosure.

FIG. 3 is a schematic diagram of a quantization rule of two scalar quantizers provided by embodiments of this disclosure. As shown in FIG. 3, characteristics of the first quantizer Q0 and the second quantizer Q1 may be expressed as follows: a reconstruction value of the first quantizer Q0 (also called a reconstruction level) may be an even integer multiple of a quantization step size, and a reconstruction value of the second quantizer Q1 may be an odd integer multiple of the quantization step size (denoted as "A"). "A", "B", "C" and "D" corresponding to black dots or black circles as shown in FIG. 3 may represent quantized states, the values corresponding to the black dots or the black circles may represent quantized transform coefficients (also called quantization values), and abscissa values (for example, −9, −8, 0, 8, 9, etc.) may represent quantization positions. The product of any quantization position and quantization step size may represent the reconstruction value corresponding to the quantization position. For example, if the quantization position of the quantization value "−2" in the quantized state A is "−4", the reconstruction value corresponding to the quantization position "−4" is "−4Δ". The quantized states A and B may be the quantized states of the first quantizer Q0, and the quantized states C and D may be the quantized states of the second quantizer Q1. The reconstruction value may be understood as a reconstructed transform coefficient, and may also be called a reconstructed transform coefficient. At this time, the quantity T of quantized states may be 4. For the convenience of description, description is made by taking T=4 as an example. A quantizer corresponding to a current transform coefficient may be determined according to the parity check of the quantization value before the current transform coefficient in a coding order or a reconstruction order.

Figure 4:
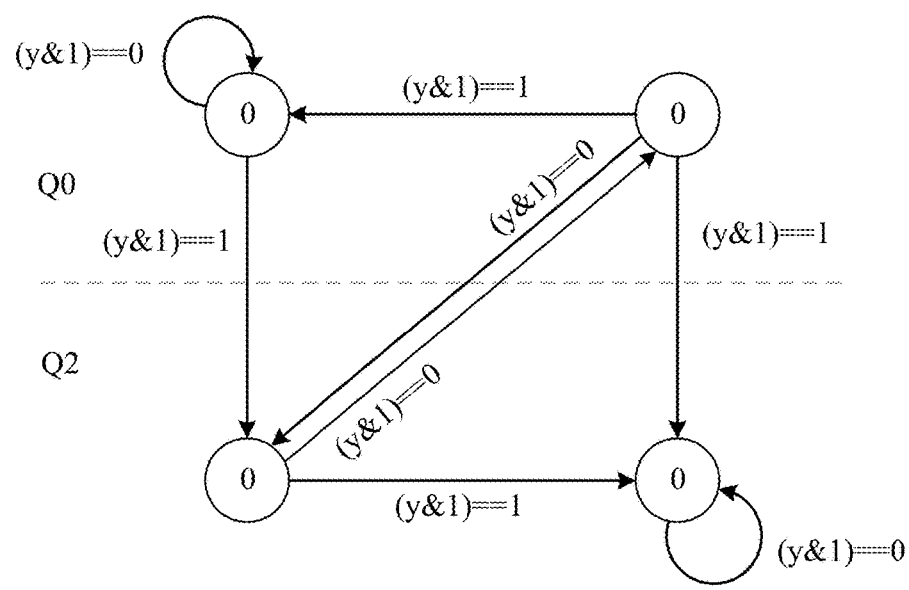
FIG. 4 is a schematic diagram of a quantized state transition process between two scalar quantizers provided by embodiments of this disclosure.

FIG. 4 is a schematic diagram of a quantized state transition process between two scalar quantizers provided by embodiments of this disclosure. Each arrow as shown in FIG. 4 may be used for indicating a direction of quantized state transition, a starting point of the arrow may be used for indicating a former quantized state (which may be called a first quantized state), and an ending point of the arrow may be used for indicating a latter quantized state (which may be called a second quantized state). That is to say, the transition process of quantized states may be transitioning from the first quantized state to the second quantized state, and the first quantized state appears earlier than the second quantized state. The first quantized state and the second quantized state may be the same quantized state, and the first quantized state and the second quantized state may also be different quantized states. For example, the first quantized state is a quantized state A, and the second quantized state may still be the quantized state A after quantized state transition. Alternatively, the first quantized state is the quantized state A, and the second quantized state may be a quantized state C after quantized state transition. The quantized state transition process as shown in FIG. 4 may be implemented according to the quantized state transition table shown in Table 1 below. The second quantized state may be determined according to the first quantized state and the parity of the quantization value in the first quantized state (i.e., the quantized transform coefficient, where the quantization value may be represented by y). For example, when "(y&1)==1" is satisfied, it may be indicated that the quantization value y in the first quantized state is odd, and when "(y&1)==0" is satisfied, it may be indicated that the quantization value y in the first quantized state is even. Table 1 may be as follows:

TABLE 1

| First quantized state | Second quantized state | |
| --- | --- | --- |
| | (y&1) == 0 | (y&1) == 1 |
| A | A | C |
| B | C | A |
| C | B | D |
| D | D | B |

Table 1 above defines state transition conditions of four quantized states. For example, a state transition condition for transitioning from the quantized state A to the quantized state A is as follows: the first quantized state is a quantized state A, and a quantization value y in the quantized state A satisfies (y&1)==0, a state transition condition for transitioning from the quantized state A to a quantized state C is as follows: the first quantized state is the quantized state A, and the quantization value y in the quantized state A satisfies (y&1)==1, and so on. In the process of quantizing the transform block with the first quantizer Q0 and the second quantizer Q1, the four quantized states (including the quantized state A, the quantized state B, the quantized state C and the quantized state D) may be transitioned according to the state transition conditions defined in Table 1.

The quantized state A, the quantized state B, the quantized state C and the quantized state D are only one representation of the four quantized states provided by the first quantizer Q0 and the second quantizer Q1. The four quantized states provided by the first quantizer Q0 and the second quantizer Q1 may also be expressed as a quantized state 0, a quantized state 1, a quantized state 2 and a quantized state 3. There may be different correspondences between the quantized states A, B, C and D and the quantized states 0, 1, 2 and 3. For example, one correspondence may be: the quantized state A corresponds to the quantized state 0, the quantized state B corresponds to the quantized state 1, the quantized state C corresponds to the quantized state 2, and the quantized state D corresponds to the quantized state 3, for another example, another correspondence may be: the quantized state A corresponds to the quantized state 2, the quantized state B corresponds to the quantized state 0, the quantized state C corresponds to the quantized state 1, and the quantized state D corresponds to the quantized state 3, and so on.

In some embodiments, dependent quantization may also be achieved by two or more scalar quantizers and the quantized state transition between the two or more scalar quantizers. Certainly, the quantity of quantized states corresponding to the two or two scalar quantizers may be more than 4, and the transition between the scalar quantizers may also be processed by using predicted values other than the state transition conditions shown in Table 1 above.

Figure 5:
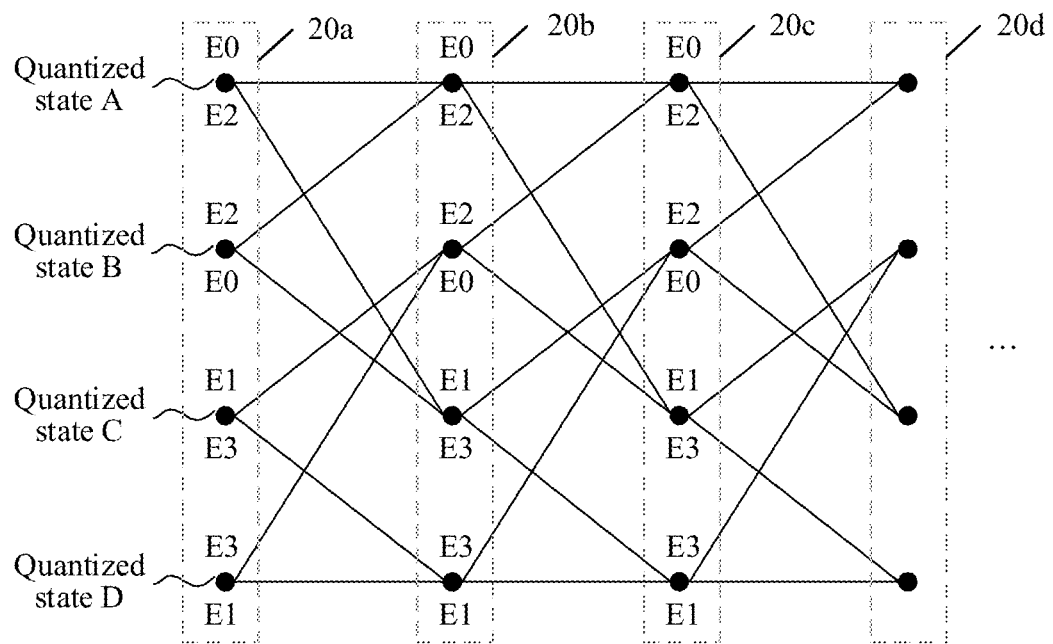
FIG. 5 is a schematic diagram of M candidate quantized state chains provided by embodiments of this disclosure.

FIG. 5 is a schematic diagram of M candidate quantized state chains provided by embodiments of this disclosure. As shown in FIG. 5, each column of black dots may represent a quantized state selection of one transform coefficient. For example, the black dots contained in a region 20a may represent four quantized state selections corresponding to a transform coefficient 1 in a transform block, the black dots contained in a region 20b may represent four quantized state selections corresponding to a transform coefficient 2 in the transform block, the black dots contained in a region 20c may represent four quantized state selections corresponding to a transform coefficient 3 in the transform block, and the black dots contained in a region 20d may represent four quantized state selections corresponding to a transform coefficient 4 in the transform block. A coding order of the transform coefficients 1, 2, 3 and 4 may be: transform coefficient 1→transform coefficient 2→transform coefficient 3→transform coefficient 4, that is, the transform coefficient 2 is the next transform coefficient of the transform coefficient 1, the transform coefficient 3 is the next transform coefficient of the transform coefficient 2, etc. E0 as shown in FIG. 5 may correspond to the quantized state A path in Table 1 above, E1 may correspond to the quantized state B path in Table 1 above, E2 may correspond to the quantized state C path in Table 1 above, and E3 may respectively correspond to the quantized state D path in Table 1 above.

Each transform coefficient in the transform block may correspond to four quantized states, that is, the black dots in the same position in each column may represent the same quantized state, for example, the first black dot in the region 20a may represent the quantized state A, the second black dot in the region 20a may represent the quantized state B, the third black dot in the region 20a may represent the quantized state C, and the fourth black dot in the region 20a may represent the quantized state D. There may be two quantization paths from each quantized state to the quantized state of the next transform coefficient. If the quantized state A may be transitioned to the quantized state A of the next transform coefficient, or the quantized state A may also be transitioned to the quantized state C of the next transform coefficient, there may be eight different quantization paths from the present transform coefficient to the next transform coefficient, for example, there may be eight different quantization paths from the transform coefficient 1 to the transform coefficient 2. Since the transform block includes multiple transform coefficients, there are multiple quantization paths from the first transform coefficient to the last transform coefficient according to the coding order of the transform coefficients contained in the transform block. At this time, the multiple quantization paths from the first transform coefficient to the last transform coefficient may be called M candidate quantized state chains associated with the transform block.

Step S102. Acquire N syntax elements corresponding to a transform coefficient i in the transform block, and acquire fixed probability models respectively corresponding to K syntax elements among the N syntax elements.

Herein, i is less than or equal to a quantity of transform coefficients in the transform block, i, N and K are all positive integers, and K is less than N.

In some embodiments, the fixed probability models respectively corresponding to the K syntax elements among the N syntax elements may be acquired in the following way: acquiring pre-configured model identifiers respectively corresponding to the K syntax elements among the N syntax elements, and acquiring the fixed probability models respectively corresponding to the K syntax elements based on the pre-configured model identifiers respectively corresponding to the K syntax elements. In this way, the fixed probability model corresponding to each of the K syntax elements may be directly acquired based on the pre-configured model identifiers, that is, there is no need to perform context modeling for the K syntax elements, which reduces the data processing in the context modeling process, thereby improving the calculation speed of a rate distortion cost.

In one or more embodiments, in a coding stage, the coding device may code quantized transform coefficients (quantization values) respectively associated with each of the M candidate quantized state chains through a coefficient coding mode coupled with dependent quantization, to calculate a path rate distortion cost of each candidate quantized state chain, and then selects the smallest path rate distortion cost as an optimal path rate distortion cost based on the calculation result. During the calculation of the path rate distortion cost of each candidate quantized state chain, it is necessary to calculate a coefficient rate distortion cost of each transform coefficient associated with the candidate quantized state chain, and then a coefficient rate distortion cost is determined according to the coefficient rate distortion cost of the transform coefficient for each candidate quantized state chain. The calculation process of the coefficient rate distortion cost is associated with the coding process of the transform coefficient.

For any transform coefficient i in the transform block, the coding device may perform entropy coding on the quantized transform coefficient i to output a bit stream, and during the coding of the transform coefficient i, it is necessary to code the syntax elements corresponding to the transform coefficient. For example, the coding device may scan the transform coefficient i in the transform block and code the N syntax elements corresponding to the transform coefficient i (N may be a positive integer, for example, N may be 5), where the N syntax elements may include:

significant_coeff_flag (sig_flag): significance of a coefficient (zero/non-zero).

coeff_abs_level_greater1_flag (gt1_flag): indicating whether an absolute value of a coefficient level is greater than 1.

coeff_abs_level_greater2_flag (gt2_flag): indicating whether the absolute value of the coefficient level is greater than 2.

parity flag (par_flag): indicating the parity of the coefficient level.

coeff_abs_level_remaining (abs_remainder): a residual value of the absolute value of the coefficient level.

The coefficient level may be understood as a quantized transform coefficient, and each syntax element may be coded into a bit stream by using Context-based Adaptive Binary Arithmetic Coding (CABAC). For coding by using CABAC, the values of non-binary syntax elements may be mapped to a binary sequence called a bin string through a binarization process. For bits in the binary sequence, one context model (also called a probability model) may be selected. the context model may refer to a probability model used for representing one or more bits, and the context model may be selected from available models. The context model selection of the transform coefficient is associated with the quantizer used during the quantization of the transform coefficient. In some embodiments, the context model of each bit may be identified by a context model index (also called a context index), and different context indexes correspond to different context models. A probability of each bit stored in the context model may be "1" or "0", and may be adaptive or static. In addition, in an adaptive coding engine, the context model may be updated based on actual coding values of bits.

During the calculation of the coefficient rate distortion cost of the transform coefficient i, the loss calculation of the N syntax elements (sig_flag, gt1_flag, gt2_flag, par_flag, and abs_remainder) is included, where the three syntax elements (gt1_flag, gt2_flag, and par_flag) may share a type of context model, and the syntax element (sig_flag) and the syntax element (abs_remainder) may use a type of context model individually.

In one or more embodiments, in order to improve the calculation efficiency of the rate distortion cost and quickly select an optimal candidate quantized state chain, the coding device may cancel a context model update of K syntax elements by fixing the context model selection of the K syntax elements. After acquiring the N syntax elements corresponding to the transform coefficient i, the coding device may acquire the K syntax elements carrying the pre-configured model identifiers from the N syntax elements. In T quantized states corresponding to the transform coefficient i, a first probability model set respectively corresponding to K syntax elements is acquired, and in the first probability model set, the probability models matching the pre-configured model identifiers are determined as fixed probability models respectively corresponding to the K syntax elements, where T is a positive integer greater than 1.

The pre-configured model identifiers may be information such as context model indexes or context model numbers, and the pre-configured model identifiers may be preset. In Versatile Video Coding (VVC), different syntax elements may correspond to different available models. The available models herein may refer to context models corresponding to different syntax elements existing in VVC. For example, the syntax element (sig_flag) may correspond to four available context models. When the transform block is a luminance block (the transform block under a luminance color component), the syntax elements (gt1_flag, gt2_flag, and par_flag) may correspond to 21 available context models. When the transform block is a chrominance block (the transform block under a chrominance color component), the syntax elements (gt1_flag, gt2_flag, and par_flag) may correspond to 11 available context models, and the syntax element (abs_remainder) may correspond to 4 available context models. If there are K syntax elements carrying pre-configured model identifiers among the N syntax elements corresponding to the transform coefficient i, the context model selection corresponding to the K syntax elements may be fixed and the context model update of the K syntax elements may be cancelled.

For example, when the K syntax elements include the syntax elements (gt1_flag, gt2_flag, and par_flag) and the syntax element (abs_remainder), at this time, K=4, and four available context models corresponding to the syntax element (abs_remainder) may be determined as the first probability model set corresponding to the syntax element (abs_remainder). In the first probability model set corresponding to the syntax element (abs_remainder), the context model matching a pre-configured model identifier may be fixedly used. At this time, the fixedly used context model may be called the fixed probability model corresponding to the syntax element (abs_remainder). For example, when the pre-configured model identifier is number 1, the first one of the four available context models may be fixedly selected as the fixed probability model. If the transform block is a luminance block, 21 available context models corresponding to the syntax elements (gt1_flag, gt2_flag, and par_flag) may be determined as the first probability model set corresponding to the syntax elements (gt1_flag, gt2_flag, and par_flag). In the first probability model set corresponding to the syntax elements (gt1_flag, gt2_flag, and par_flag), the context models matching pre-configured model identifiers may be fixedly used. At this time, the fixedly used context models may be called the fixed probability models corresponding to the syntax elements (gt1_flag, gt2_flag, and par_flag). For example, when the pre-configured model identifier is number 1, the first one of the 21 available context models may be fixed as the fixed probability model. If the transform block is a chrominance block, 11 available context models corresponding to the syntax elements (gt1_flag, gt2_flag, and par_flag) may be determined as the first probability model set corresponding to the syntax elements (gt1_flag, gt2_flag, and par_flag). In the first probability model set corresponding to the syntax elements (gt1_flag, gt2_flag, and par_flag), the context models matching the pre-configured model identifiers may be fixedly used. At this time, the fixedly used context models may be called the fixed probability models corresponding to the syntax elements (gt1_flag, gt2_flag, and par_flag). For example, when the pre-configured model identifier is number 1, the first one of the 11 available context models may be fixed as the fixed probability model. Assuming that the quantity of transform coefficients contained in the transform block is X, the number of times of updating the context model may be reduced from 12*X (one transform coefficient may correspond to four quantized states, and N syntax elements corresponding to one transform coefficient correspond to three types of context models, so the context model needs to be updated 3*4 times for one transform coefficient) to 4*X (the context models corresponding to the syntax element gt1_flag, the syntax element gt2_flag, the syntax element par_flag, and the syntax element abs_remainder are fixedly used, that is, there is no need to update the context models of the four syntax elements, but only the context model of the syntax element sig_flag needs to be updated) through the above method, which can greatly reduce calculation overhead and complexity, thereby increasing the coding speed of multimedia data. In some embodiments, the K syntax elements may include any one or more of the syntax elements (sig_flag, gt1_flag, gt2_flag, par_flag, and abs_remainder), for example, the K syntax elements include the syntax element (sig_flag), or the K syntax elements include the syntax elements (gt1_flag, gt2_flag, and par_flag), or the K syntax elements include the syntax element (abs_remainder), or the K syntax elements include the syntax elements (sig_flag, gt1_flag, gt2_flag, and par_flag), etc.

Step S103. Perform context modeling for (N-K) syntax elements according to adjacent coding coefficients of the transform coefficient i, to obtain target probability models respectively corresponding to the (N-K) syntax elements.

The (N-K) syntax elements mentioned in the embodiments of this disclosure refer to syntax elements other than the K syntax elements. For example, the N syntax elements include a syntax element a, a syntax element b, a syntax element c and a syntax element d, the K syntax elements include the syntax element a and the syntax element b, and then the (N-K) syntax elements mentioned in the embodiments of this disclosure include the syntax element c and the syntax element d.

In one or more embodiments, for the remaining (N-K) syntax elements among the N syntax elements, the coding device may acquire the adjacent coding coefficients of the transform coefficient i, and perform context modeling for the (N-K) syntax elements, to obtain the target probability models respectively corresponding to the (N-K) syntax elements, that is, select the target probability models for coding the (N-K) syntax elements according to the adjacent coding coefficients. In other words, the uncoded transform coefficient i may be coded by using the information of a coded coefficient (for example, the information of coded syntax elements, which may also be called adjacent coding coefficients) as a condition. This process may be called context modeling. For example, the context modeling of the (N-K) syntax elements corresponding to the transform coefficient i needs to be performed by using the information of adjacent coding coefficients (adjacent regions). The quantized states of the adjacent coding coefficients are different when the quantized state of the current transform coefficient i is different.

In some embodiments, in the process of coding the transform coefficient i, the coding device may acquire the adjacent coding coefficients of the transform coefficient i in a target quantized state, and acquire (N-K) coded syntax elements in the adjacent coding coefficients, the target quantized state belonging to the T quantized states, T being a positive integer greater than 1. For example, the coding device may acquire the adjacent coding coefficients in different quantized states; in the target quantized state, acquired a second probability model set respectively corresponding to the (N-K) syntax elements of the transform coefficient i; and allocate target probability models to the (N-K) syntax elements of the transform coefficient i from the second probability model set according to the (N-K) coded syntax elements corresponding to the adjacent coding coefficients. The second probability model set may refer to the available context models of the remaining (N-K) syntax elements in Versatile Video Coding (VVC). For example, when the K syntax elements include the syntax elements (gt1_flag, gt2_flag, and par_flag) and the syntax element (abs_remainder), the remaining (N-K) syntax elements include the syntax element (sig_flag), and the second probability model set at this time may include four available context models corresponding to the syntax elements (sig_flag). The context modeling performed for the (N-K) syntax elements in the target quantized state of the transform coefficient i may be understood as a context model update for the transform coefficient i. When the transform coefficient i corresponds to four quantized states, context model updating needs to be performed four times for all the (N-K) syntax elements.

The process of performing context modeling for the (N-K) syntax elements according to the adjacent coding coefficients may include: the coding device may acquire coding reconstruction absolute values in the adjacent coding coefficients according to the (N-K) coded syntax elements corresponding to the adjacent coding coefficients, and acquire a global reconstruction cumulative value and a local reconstruction cumulative value corresponding to the adjacent coding coefficients according to the coding reconstruction absolute values; acquire a quantity of non-zero values in the transform block, acquire a horizontal coordinate and a vertical coordinate of the transformation coefficient i in the transform block, and determine a sum of the horizontal coordinate and the vertical coordinate as a diagonal position corresponding to the transform coefficient i; and allocate the target probability models to the (N-K) syntax elements of the transform coefficient i from the second probability model set according to the global reconstruction cumulative value, the local reconstruction cumulative value, the quantity of non-zero values and the diagonal position. The coding reconstruction absolute values may refer to absolute values of coding reconstruction values in the adjacent coding coefficients (adjacent regions). The global reconstruction cumulative value may be marked as sumAbs, and used for representing a sum of the absolute values of the coding reconstruction values in the adjacent coding coefficients. The local reconstruction cumulative value may be marked as sumAbs1, and used for representing a sum of the absolute values of some of the coding reconstruction values in the adjacent coding coefficients. The quantity of non-zero values may be marked as numSig, and used for representing the quantity of the non-zero values in the current transform block. The diagonal position may be marked as dis, and used for representing a sum of the horizontal coordinate and the vertical coordinate of the transform coefficient i in the current transform block. The probability models for coding the syntax elements sig_flag, par_flag, gt1_flag and gt2_flag are selected through the quantity of non-zero values numSig, the local reconstruction cumulative value sumAbs1 and the value of the diagonal position dis, and the probability models for coding the syntax element abs_remainder is selected based on the global reconstruction cumulative value sumAbs and the quantity of non-zero values numSig. For example, when the (N-K) syntax elements include the syntax element sig_flag, the target probability model for coding the syntax element sig_flag may be selected from the second probability model set corresponding to the syntax element sig_flag according to the local reconstruction cumulative value sumAbs1 in the adjacent coding coefficients, the quantity of non-zero values numSig in the current transform block and the diagonal position dis.

Figure 6:
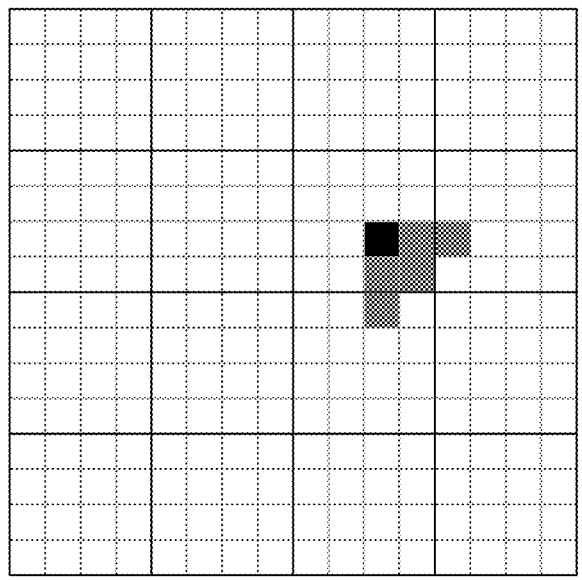
FIG. 6 is a schematic diagram of context modeling provided by embodiments of this disclosure.

FIG. 6 is a schematic diagram of context modeling provided by embodiments of this disclosure. As shown in FIG. 6, the size of an image block may be 16*16, the image block may be a coded block in a video frame image, and the image block may include 16 transform blocks with a size of 4*4. As shown in FIG. 6, a black region may represent a transform coefficient i in a current transform block, and gray regions may represent adjacent coding coefficients used during coding of the transform coefficient i, where the quantity of the adjacent coding coefficients corresponding to the transform coefficient i may be 5. Certainly, the quantity of the adjacent coding coefficients used for coding the transform coefficient i may also be other values, such as 6 and 7. When the coding device codes the syntax element sig_flag of the transform coefficient i, any combination of the coded syntax elements sig_flag of five adjacent coding coefficients and their mapping values may be used as a context to perform the context modeling of the syntax element sig_flag. In some embodiments, the information of all or some of the coded syntax elements of the five adjacent coding coefficients may be used as a context of coding the transform coefficient i.

For the K syntax elements of the transform coefficient i, context modeling is performed by directly fixedly using the fixed probability models in the first probability model set, without using the adjacent coding coefficients.

Step S104. Determine a coefficient rate distortion cost of the transform coefficient i according to pre-coding results of pre-coding the K syntax elements according to the fixed probability models, pre-coding results of pre-coding the (N-K) syntax elements according to the target probability models, and a quantization reconstruction value corresponding to the transform coefficient i.

In one or more embodiments, the coding device may acquire a bit rate loss of the transform coefficient i in the T quantized states according to the pre-coding results of pre-coding the K syntax elements according the fixed probability models and the pre-coding results of pre-coding the (N-K) syntax elements according to the target probability models. In other words, the coding device may pre-code the K syntax elements of the transform coefficient i in the K quantized states according to the fixed probability models, to obtain the pre-coding results respectively corresponding to the K syntax elements; pre-code the (N-K) syntax elements of the transform coefficient i in the T quantized states according to the target probability models, to obtain the pre-coding results respectively corresponding to the (N-K) syntax elements; and acquire a bit rate loss of the transform coefficient i in the T quantized states according to the pre-coding results respectively corresponding to the K syntax elements and the pre-coding results respectively corresponding to the (N-K) syntax elements.

The context model in Versatile Video Coding (VVC) may be used for storing parameters related to the probability that bits are 1 or 0, that is, the fixed probability models may be probability models for the K syntax elements, the target probability models may be probability models for the (N-K) syntax elements, and the pre-coding results respectively corresponding to the N syntax elements may be coded bits output by a CABAC algorithm. The pre-coding herein may refer to the coding in order to select an optimal quantized state chain, and the coded bits at this time will not be transmitted to the decoding end. Each syntax element of the transform coefficient i may be used as an input of the CABAC algorithm, and an output of CABAC algorithm is coded bits. For the syntax elements input into the CABAC algorithm, the probability models of the syntax elements (including the fixed probability models corresponding to the K syntax elements and the target probability models corresponding to the (N-K) syntax elements) are determined. According to the values of the input syntax elements and the probability models of the syntax elements, an interval starting point (low) and an interval width (range) in a CABAC coder may be adjusted, and the probability models may also be updated. The process of the CABAC algorithm may include: receiving an interval starting point (Low_input) and an interval width (range_input); receiving a syntax element and a probability model of the syntax element, and calculating an interval length occupied by a value of 0 (R0=range_input p(0)) and an interval length occupied by 1 (R1=range_input-R0), where p(0) may represent a probability corresponding to 0 in the probability model; and updating the interval starting point (Low_input) and the interval width (range_input) according to the value of the received syntax element. If the value of the syntax element is 1, the updated interval starting point (Low_input) is still Low_input, and the updated interval width range output is reduced to R1. If the value of the received syntax element is 0, the interval starting point (Low_input) is updated to Low_input+R1, and the interval width (range_input) is reduced to R0. Through the pre-coding results output by the CABAC algorithm, the bit rate loss of the transform coefficient i in the T quantized states may be calculated.

The coding device may acquire the quantization reconstruction value corresponding to the transform coefficient i through a first quantizer and a second quantizer, and determine the distortion loss of the transform coefficient i in the T quantized states according to the transform coefficient i and the quantization reconstruction value (the product of abscissa values and a quantization step size as shown in FIG. 3). The coefficient rate distortion cost of the transform coefficient i in the T quantized states is determined according to the distortion loss and the bit rate loss. The coefficient rate distortion cost may be expressed as $RDC=D(W,\hat{W})+\lambda \times R(y)$, and RDC may represent coefficient rate distortion cost, where W is a transform coefficient before quantization, y is a quantized transform coefficient (quantization value), $\hat{W}$ is a quantization reconstruction value, and $\lambda$ is a parameter, and may be set artificially; R(y) represents a bit rate loss required to code the quantized transform coefficient, and $D(W, \hat{W})$ represents the distortion loss, and may be calculated by using square error: $D(W, \hat{W})=(W-\hat{W})^2$.

Step S105. Determine path rate distortion costs respectively corresponding to the M candidate quantized state chains according to a coefficient rate distortion cost of each transform coefficient in the transform block.

In one or more embodiments, for each transform coefficient in the transform block, the coefficient rate distortion cost may be calculated, and the path rate distortion costs respectively corresponding to each candidate quantized state chain may be obtained by accumulating the coefficient rate distortion cost of each transform coefficient on each candidate quantized state chain. In other words, the coding device may acquire the coefficient rate distortion costs respectively corresponding to each transform coefficient in the transform block, and accumulate coefficient rate distortion costs respectively associated with each candidate quantized state chain among the M candidate quantized state chains to obtain the path rate distortion costs of each candidate quantized state chain.

In some embodiments, the coding device may determine the candidate quantized state chain with the smallest path rate distortion cost as a target quantized state chain of the transform block; traverse the transform coefficients contained in the transform block according to the target quantized state chain, and save the coefficient quantization value (quantized transform coefficient) of each transform coefficient in the transform block; and obtain a coded bit stream of the transform block by performing entropy coding processing on the coefficient quantization value, and output the coded bit stream to the decoding end, so that the decoding end decodes the coded bit stream and displays the decoded multimedia data at the decoding end. The entropy coding herein is still implemented using the CABAC algorithm, and the target quantized state chain may be the selected optimal quantized state chain among the M candidate quantized state chains, that is, the candidate quantized state chain with the smallest path rate distortion cost.

In the embodiments of this disclosure, M candidate quantized state chains corresponding to a transform block in multimedia data may be acquired, where the M candidate quantized state chains are determined by a quantized state of a transform coefficient in the transform block, and M is a positive integer. That is, in the coding process of the multimedia data, one transform block in the multimedia data may correspond to multiple candidate quantized state chains, for a transform coefficient i in the transform block of the multimedia data, N syntax elements for expressing the transform coefficient i may be acquired, where the N syntax elements may include K syntax elements carrying pre-configured model identifiers, probability models of the K syntax elements may be fixed, and fixed probability models respectively corresponding to the K syntax elements may be acquired directly based on the pre-configured model identifiers. Context modeling may be performed on the remaining (N-K) syntax elements through adjacent coding coefficients of the transform coefficient i, to obtain target probability models respectively corresponding to the (N-K) syntax elements, that is, the context modeling is performed for only some of syntax elements corresponding to the transform coefficient i, which reduces the context modeling, and then a coefficient rate distortion cost of the transform coefficient i is determined through the fixed probability models, the target probability models and a quantization reconstruction value corresponding to the transform coefficient i, so that the calculation resources and calculation time of the coefficient rate distortion cost are reduced, and thus, the optimization speed of the rate distortion cost can be improved, thereby increasing the coding speed of the multimedia data.

Figure 7:
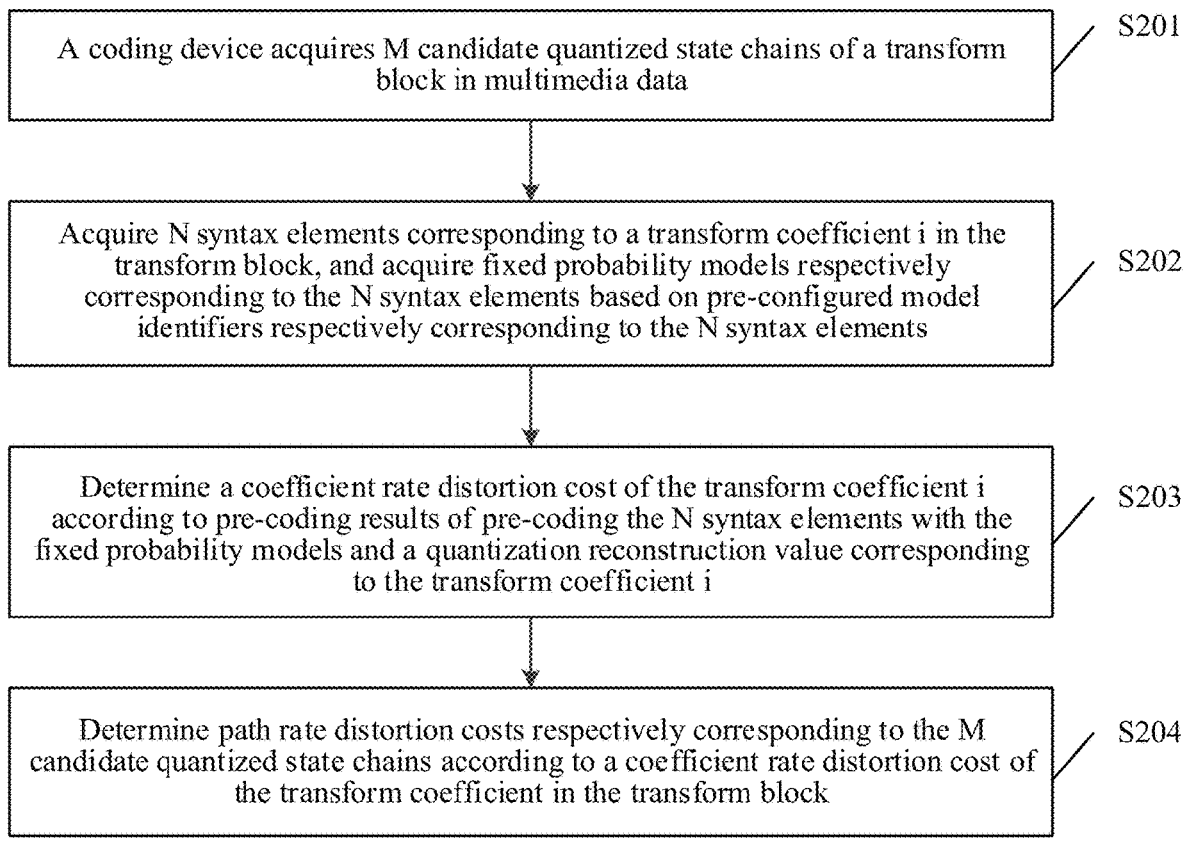
FIG. 7 is a schematic flowchart of a data processing method provided by embodiments of this disclosure.

FIG. 7 is a schematic flowchart of a data processing method provided by embodiments of this disclosure. The data processing method is executed by a coding device, which may be a user terminal, or an independent server, or a system composed of a user terminal and a server, or a computer program (including a program code). As shown in FIG. 7, the data processing method may include the following steps:

Step S201. The coding device acquires M candidate quantized state chains of a transform block in multimedia data.

Herein, the M candidate quantized state chains are determined according to a quantized state of each transform coefficient in the transform block, and M is a positive integer.

Step S202. Acquire N syntax elements corresponding to a transform coefficient i in the transform block, and acquire fixed probability models respectively corresponding to the N syntax elements based on pre-configured model identifiers respectively corresponding to the N syntax elements.

Herein, i is a positive integer less than or equal to a quantity of coefficients contained in the transform block, and N is a positive integer.

Step S203. Determine a coefficient rate distortion cost of the transform coefficient i according to pre-coding results of pre-coding the N syntax elements according to the fixed probability models and a quantization reconstruction value corresponding to the transform coefficient i.

Step S204. Determine path rate distortion costs respectively corresponding to the M candidate quantized state chains according to a coefficient rate distortion cost of each transform coefficient in the transform block.

In one or more embodiments, in order to improve the calculation speed of path rate distortion costs, a context model update of N syntax elements (sig_flag, gt1_flag, gt2_flag, par_flag, and abs_remainder) of the transform coefficient i may be canceled. In other words, in one or more embodiments of this disclosure, there is no need to perform context modeling according to adjacent coding coefficients of the transform coefficient i in the transform block, and the fixed probability models matching the pre-configured model identifiers are fixedly used for all the N syntax elements. In addition, for the rest of the implementation process, reference may be made to the description of steps S101-S105 in the embodiments corresponding to FIG. 2.

In the embodiments of this disclosure, M candidate quantized state chains of a transform block in multimedia data may be acquired, where the M candidate quantized state chains are determined by a quantized state of each transform coefficient in the transform block, and M is a positive integer. That is, in the coding process of the multimedia data, one transform block in the multimedia data may correspond to multiple candidate quantized state chains, for a transform coefficient i in the transform block of the multimedia data, N syntax elements for expressing the transform coefficient i may be acquired, where all the N syntax elements may carry pre-configured model identifiers, probability models (context models) of the N syntax elements may be fixedly used, and fixed probability models respectively corresponding to the N syntax elements may be acquired directly based on the pre-configured model identifiers without context modeling. Then, a coefficient rate distortion cost of the transform coefficient i may be determined through the fixed probability models and a quantization reconstruction value corresponding to the transform coefficient i, and path rate distortion costs respectively corresponding to the M candidate quantized state chains may be calculated based on a coefficient rate distortion cost of each transform coefficient in the transform block. Thus, by reducing the calculation overhead of the coefficient rate distortion cost, the optimization speed of the rate distortion cost can be improved, and thus, the coding speed of multimedia data can be increased.

Figure 8:
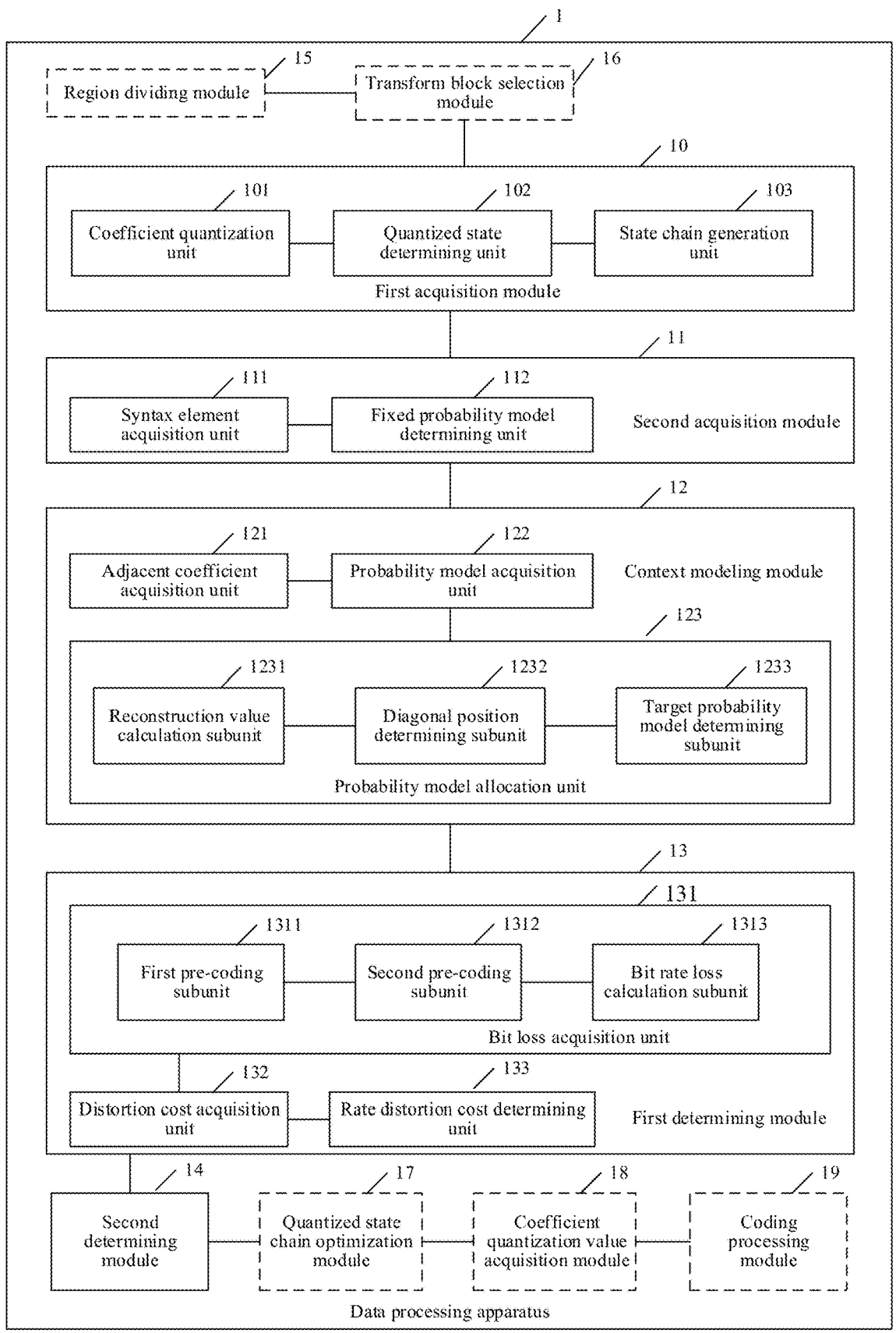
FIG. 8 is a schematic structural diagram of a data processing apparatus provided by embodiments of this disclosure.

FIG. 8 is a schematic structural diagram of a data processing apparatus provided by embodiments of this disclosure. The data processing apparatus may be a computer program (including a program code) running in a computer device. For example, the data processing apparatus may be application software configured to execute coding processing in the computer device. As shown in FIG. 8, the multimedia coding apparatus 1 may include: a first acquisition module 10, a second acquisition module 11, a context modeling module 12, a first determining module 13 and a second determining module 14.

The term "module" (and other similar terms such as unit, submodule, etc.) refers to computing software, firmware, hardware, and/or various combinations thereof. At a minimum, however, modules are not to be interpreted as software that is not implemented on hardware, firmware, or recorded on a non-transitory processor readable recordable storage medium. Indeed "module" is to be interpreted to include at least some physical, non-transitory hardware such as a part of a processor, circuitry, or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices. The modules can be implemented in software stored in memory or non-transitory computer-readable medium. The software stored in the memory or medium can run on a processor or circuitry (e.g., ASIC, PLA, DSP, FPGA, or any other integrated circuit) capable of executing computer instructions or computer code. The modules can also be implemented in hardware using processors or circuitry which can be implemented on the same or different integrated circuit.

The first acquisition module 10 is configured to acquire M candidate quantized state chains of a transform block in multimedia data, the M candidate quantized state chains being determined according to a quantized state of a transform coefficient in the transform block, and M being a positive integer.

The second acquisition module 11 is configured to acquire N syntax elements of a transform coefficient i in the transform block, and acquire fixed probability models respectively corresponding to K syntax elements among the N syntax elements, i being less than or equal to a quantity of transform coefficients in the transform block, i, N and K being all positive integers, K being less than the N.

The context modeling module 12 is configured to perform context modeling for (N-K) syntax elements according to adjacent coding coefficients of the transform coefficient i, to obtain target probability models respectively corresponding to the (N-K) syntax elements.

The first determining module 13 is configured to determine a coefficient rate distortion cost corresponding to the transform coefficient i according to pre-coding results of pre-coding the K syntax elements according the fixed probability models, pre-coding results of pre-coding the (N-K) syntax elements according to the target probability models, and a quantization reconstruction value corresponding to the transform coefficient i.

The second determining module 14 is configured to determine path rate distortion costs corresponding to the M candidate quantized state chains respectively according to a coefficient rate distortion cost of each transform coefficient in the transform block.

In one or more embodiments, the second determining module 14 is further configured to:

acquire the coefficient rate distortion cost of each transform coefficient in the transform block, and accumulate coefficient rate distortion costs respectively associated with each of the M candidate quantized state chains to obtain the path rate distortion costs respectively corresponding to the M candidate quantized state chains.

In one or more embodiments, the multimedia data includes a video frame image.

The multimedia coding apparatus 1 further includes: a region dividing module 15 and a transform block selection module 16.

The region dividing module 15 is configured to acquire a video frame image, and divide the video frame image according to unit allocation information corresponding to the video frame image, to obtain at least two pixel regions.

The transform block selection module 16 is configured to determine a transform block from the at least two pixel regions according to a coding order of the at least two pixel regions.

In one or more embodiments, the first acquisition module 10 may include: a coefficient quantization unit 101, a quantized state determining unit 102, and a state chain generation unit 103.

The coefficient quantization unit 101 is configured to acquire the transform coefficient i and a transform coefficient (i+1) contained in the transform block of the multimedia data, and acquire a quantization value of the transform coefficient i in T quantized states according to a first quantizer and a second quantizer, the first quantizer and the second quantizer respectively including T/2 quantized states, and T being a positive integer greater than 1.

The quantized state determining unit 102 is configured to determine a subsequent quantized state corresponding to a quantized state of the transform coefficient i according to parity of the quantization value of the transform coefficient i, and determine the subsequent quantized state as a quantized state of the transform coefficient (i+1), the subsequent quantized state belonging to the T quantized states.

The state chain generation unit 103 is configured to generate the M candidate quantized state chains corresponding to the transform block according to the quantized state of the transform coefficient i and the quantized state of the transform coefficient (i+1).

In one or more embodiments, the second acquisition module 11 may include: a syntax element acquisition unit 111 and a fixed probability model determining unit 112.

The syntax element acquisition unit 111 is configured to acquire the N syntax elements corresponding to the transform coefficient i in the transform block, and acquire the K syntax elements carrying pre-configured model identifiers from the N syntax elements.

The fixed probability model determining unit 112 is configured to acquire a first probability model set respectively corresponding to the K syntax elements in the T quantized states corresponding to the transform coefficient i, and determine, in the first probability model set, probability models matching the pre-configured model identifiers as fixed probability models respectively corresponding to the K syntax elements, T being a positive integer greater than 1.

In one or more embodiments, the context modeling module 12 may include: an adjacent coefficient acquisition unit 121, a probability model set acquisition unit 122, and a probability model allocation unit 123.

The adjacent coefficient acquisition unit 121 is configured to acquire adjacent coding coefficients of the transform coefficient i in a target quantized state in the multimedia data, and acquire (N-K) coded syntax elements in the adjacent coding coefficients, the target quantized state belonging to the T quantized states, T being a positive integer greater than 1.

The probability model set acquisition unit 122 is configured to acquire a second probability model set respectively corresponding to the (N-K) syntax elements of the transform coefficient i in the target quantized state.

The probability model allocation unit 123 is configured to allocate the target probability models to the (N-K) syntax elements of the transform coefficient i from the second probability model set according to the (N-K) coded syntax elements corresponding to the adjacent coding coefficients.

In one or more embodiments, the probability model allocation unit 123 may include: a reconstruction value calculation subunit 1231, a diagonal position determining subunit 1232 and a target probability model determining subunit 1233.

The reconstruction value calculation subunit 1231 is configured to acquire coding reconstruction absolute values in the adjacent coding coefficients according to the (N-K) coded syntax elements corresponding to the adjacent coding coefficients, and acquire a global reconstruction cumulative value and a local reconstruction cumulative value corresponding to the adjacent coding coefficients according to the coding reconstruction absolute values.

The diagonal position determining subunit 1232 is configured to acquire a quantity of non-zero values in the transform block, acquire a horizontal coordinate and a vertical coordinate of the transform coefficient i in the transform block, and determine a sum of the horizontal coordinate and the vertical coordinate as a diagonal position corresponding to the transform coefficient i.

The target probability model determining subunit 1233 is configured to allocate the target probability models to the (N-K) syntax elements of the transform coefficient i from the second probability model set according to the global reconstruction cumulative value, the local reconstruction cumulative value, the quantity of non-zero values and the diagonal position.

In one or more embodiments, the first determining module 13 may include: a bit rate loss acquisition unit 131, a distortion loss acquisition unit 132, and a rate distortion cost determining unit 133.

The bit rate loss acquisition unit 131 is configured to acquire a bit rate loss of the transform coefficient i in the T quantized states according to the pre-coding results of pre-coding the K syntax elements according to the fixed probability models and the pre-coding results of pre-coding the (N-K) syntax elements according to the target probability models, T being a positive integer greater than 1.

The distortion loss acquisition unit 132 is configured to acquire the quantization reconstruction value corresponding to the transform coefficient i through the first quantizer and the second quantizer, and determine the distortion loss of the transform coefficient i in the T quantized states according to the transform coefficient i and the quantization reconstruction value.

The rate distortion cost determining unit 133 is configured to determine the coefficient rate distortion cost of the transform coefficient i in the T quantized states according to the distortion loss and the bit rate loss.

In one or more embodiments, the bit rate loss acquisition unit 131 may include: a first pre-coding subunit 1311, a second pre-coding subunit 1312, and a bit rate loss calculation subunit 1313.

The first pre-coding subunit 1311 is configured to pre-code the K syntax elements of the transform coefficient I in the T quantized states according to the fixed probability models, to obtain the pre-coding results respectively corresponding to the K syntax elements.

The second pre-coding subunit 1312 is configured to pre-code the (N-K) syntax elements of the transform coefficient i in the T quantized states according to the target probability models, to obtain pre-coding results respectively corresponding to the (N-K) syntax elements.

The bit rate loss calculation subunit 1313 is configured to acquire the bit rate loss of the transform coefficient i in the T quantized states according to the pre-coding results respectively corresponding to the K syntax elements and the pre-coding results respectively corresponding to the (N-K) syntax elements.

In one or more embodiments, the data processing apparatus 1 may include: a quantized state chain optimization module 17, a coefficient quantization value acquisition module 18, and a coding processing module 19.

The quantized state chain optimization module 17 is configured to determine a candidate quantized state chain corresponding to the smallest path rate distortion cost as a target quantized state chain of the transform block.

The coefficient quantization value acquisition module 18 is configured to traverse transform coefficients contained in the transform block according to the target quantized state chain, and acquire coefficient quantization values respectively corresponding to each transform coefficient in the transform block.

The coding processing module 19 is configured to perform entropy coding processing on the coefficient quantization values to obtain a coded bit stream corresponding to the transform block, and output the coded bit stream to a decoding end.

For specific function implementations of the quantized state chain optimization module 17, the coefficient quantization value acquisition module 18, and the coding processing module 19, reference may be made to step S105 in the embodiments corresponding to FIG. 3.

In the embodiments of this disclosure, M candidate quantized state chains of a transform block in multimedia data may be acquired, where the M candidate quantized state chains are determined by a quantized state of a transform coefficient in the transform block, and M is a positive integer. That is, in the coding process of the multimedia data, one transform block in the multimedia data may correspond to multiple candidate quantized state chains, for a transform coefficient i in the transform block of the multimedia data, N syntax elements for expressing the transform coefficient i may be acquired, where the N syntax elements may include K syntax elements carrying pre-configured model identifiers, probability models of the K syntax elements may be fixed, and fixed probability models respectively corresponding to the K syntax elements may be acquired directly based on the pre-configured model identifiers. Context modeling may be performed on the remaining (N-K) syntax elements through adjacent coding coefficients of the transform coefficient i, to obtain target probability models respectively corresponding to the (N-K) syntax elements, which may reduce the context modeling. Then, a coefficient rate distortion cost corresponding to the transform coefficient i may be determined through the fixed probability models, the target probability models and a quantization reconstruction value corresponding to the transform coefficient i, and path rate distortion costs respectively corresponding to the M candidate quantized state chains may be calculated based on a coefficient rate distortion cost corresponding to each transform coefficient in the transform block. Since the context modeling is performed for the (N-K) syntax elements, that is, the context modeling is performed for only some of syntax elements corresponding to the transform coefficient i, which reduces the data processing in the context modeling process, and thus reduces the calculation resources and calculation time of the coefficient rate distortion cost, thereby improving the optimization speed of the rate distortion cost, thus increasing the coding speed of the multimedia data.

Figure 9:
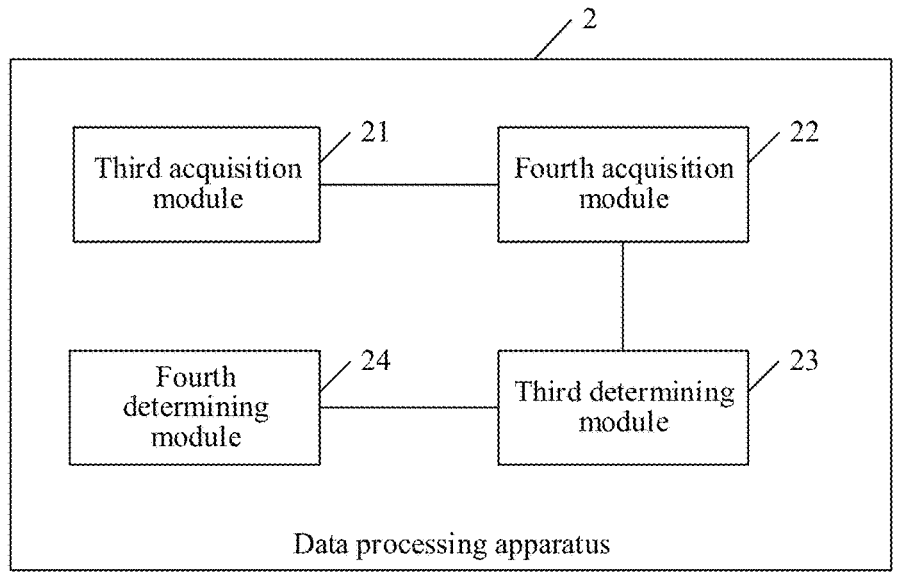
FIG. 9 is a schematic structural diagram of a data processing apparatus provided by embodiments of this disclosure.

FIG. 9 is a schematic structural diagram of a data processing apparatus provided by embodiments of this disclosure. The data processing apparatus may be a computer program (including a program code) running in a computer device. For example, the data processing apparatus may be application software configured to execute coding processing in the computer device. As shown in FIG. 9, the multimedia coding apparatus 2 may include: a third acquisition module 21, a fourth acquisition module 22, a third determining module 23 and a fourth determining module 24.

The third acquisition module 21 is configured to acquire M candidate quantized state chains of a transform block in multimedia data, the M candidate quantized state chains being determined by a quantized state of a transform coefficient in the transform block, M being a positive integer.

The fourth acquisition module 22 is configured to acquire N syntax elements corresponding to a transform coefficient i in the transform block, and acquire fixed probability models respectively corresponding to the N syntax elements, i being less than or equal to a quantity of transform coefficients in the transform block, and i and N being positive integers.

The third determining module 23 is configured to determine a coefficient rate distortion cost of the transform coefficient i according to pre-coding results of pre-coding the N syntax elements according to the fixed probability models and a quantization reconstruction value corresponding to the transform coefficient i.

The fourth determining module 24 is configured to determine path rate distortion costs respectively corresponding to the M candidate quantized state chains according to a coefficient rate distortion cost of each transform coefficient in the transform block.

Figure 10:
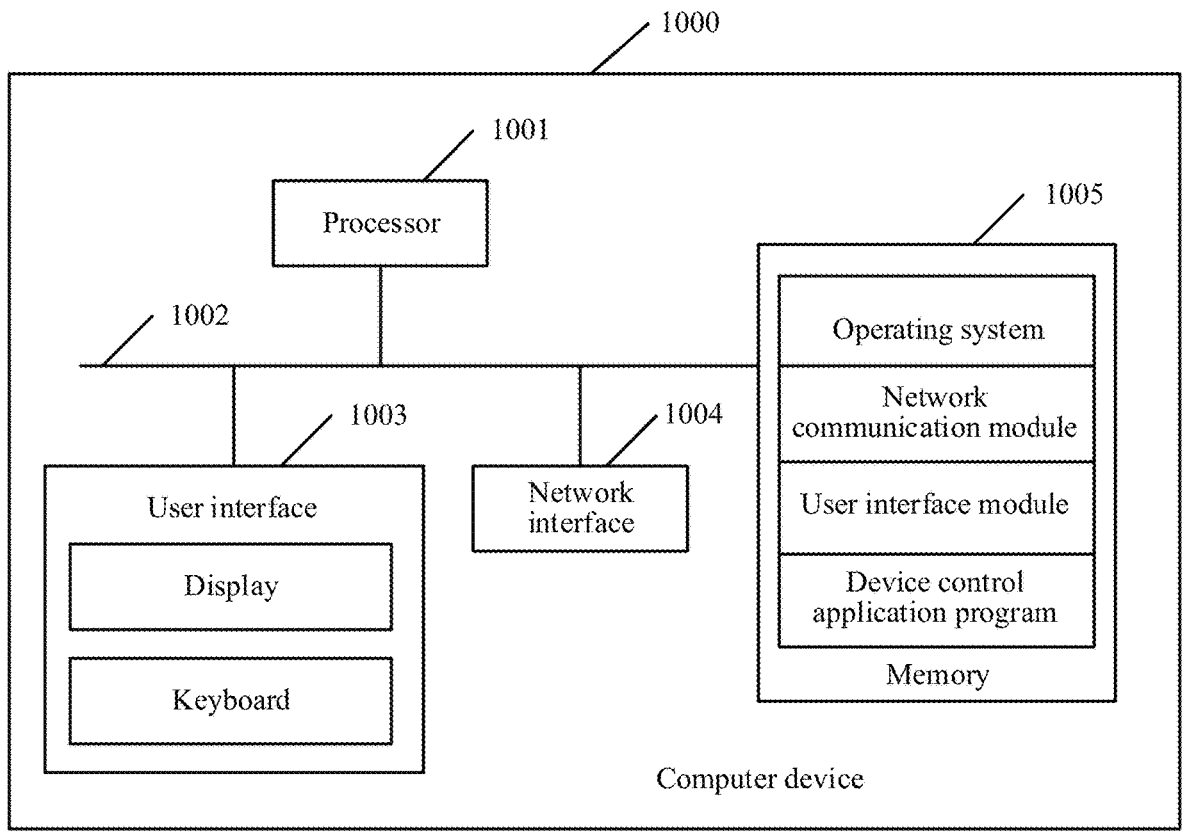
FIG. 10 is a schematic structural diagram of a computer device provided by embodiments

FIG. 10 is a schematic structural diagram of a computer device provided by embodiments of this disclosure. As shown in FIG. 10, the computer device 1000 may be a user terminal or a server, which is not limited herein. For convenience of understanding, in this disclosure, taking the computer device being a user terminal, the computer device 1000 may include: a processor 1001, a network interface 1004 and a memory 1005. In addition, the computer device 1000 may also include: a user interface 1003 and at least one communication bus 1002. The communication bus 1002 is configured to implement connection and communication between these components. The user interface 1003 may further include standard wired interface and wireless interfaces. The network interface 1004 may include standard wired interface and wireless interfaces (such as a Wi-Fi interface). The memory 1005 may be a high-speed RAM, or a non-transitory memory, for example, at least one magnetic disk memory. The memory 1005 may be at least one storage apparatus located away from the processor 1001. As shown in FIG. 10, the memory 1005 as a computer-readable storage medium may include an operating system, a network communication module, a user interface module, and a device control application program.

The network interface 1004 in the computer device 1000 may also provide a network communication function, and the exemplary user interface 1003 may also include a display and a keyboard. In the computer device 1000 shown in FIG. 10, the network interface 1004 may provide a network communication function. The user interface 1003 is mainly configured to provide an input for a user. The processor 1001 may be configured to invoke a device control application stored in the memory 1005 to implement the above data processing method provided by the embodiments of this disclosure.

It is to be understood that the computer device 1000 described in the embodiments of this disclosure may execute the description of the data processing method in the embodiments corresponding to either one of FIG. 2 and FIG. 7, the description of the data processing apparatus 1 in the embodiments corresponding to FIG. 8, or the description of the data processing apparatus 2 in the embodiments corresponding to FIG. 9. In addition, the beneficial effects using the same method are not described herein again.

In addition, it is to be pointed out herein that embodiments of this disclosure further provide a computer-readable storage medium, the computer-readable storage medium stores the computer program executed by the aforementioned data processing apparatus 1, and the computer program includes a program instruction, where when a processor executing the program instruction, the description of the data processing method in the embodiments corresponding to either one of FIG. 2 and FIG. 7 can be executed. In addition, the beneficial effects using the same method are not described herein again. For the technical details that are not disclosed in the computer-readable storage medium embodiments involved in this disclosure, please refer to the description of the method embodiments of this disclosure. As an example, the program instruction may be deployed and executed on one computing device, or executed on multiple computing devices located at one location, or executed on multiple computing devices distributed at multiple locations and interconnected through a communication network, and the multiple computing devices distributed in the multiple locations and interconnected through the communication network can form a blockchain system.

In addition, embodiments of this disclosure further provide a computer program product or a computer program, the computer program product or the computer program may include a computer instruction, and the computer instruction may be stored in a computer-readable storage medium. A processor of the computer device reads the computer instruction from the computer-readable storage medium, and the processor may execute the computer instruction, so that the computer device performs the description of the data processing method in the embodiments corresponding to either one of FIG. 2 and FIG. 7. In addition, the beneficial effects using the same method are not described herein again. For the technical details that are not disclosed in the computer program product or computer program embodiments involved in this disclosure, please refer to the description of the method embodiments of this disclosure.

For the sake of simple description, all the above method embodiments are expressed as a series of action combinations, but a person skilled in the art knows that this disclosure is not limited by the described action order, because some steps can be performed in other orders or at the same time according to this disclosure. In addition, a person skilled in the art also knows that all the embodiments described in the description are preferred embodiments, and the related actions and modules are not necessarily required by this disclosure.

The steps in the methods in the embodiments of this disclosure may be adjusted, merged and deleted in order according to actual needs.

The modules in the apparatuses in the embodiment of this disclosure may be merged, divided and deleted according to actual needs.

A person of ordinary skill in the art may understand that all or some of the processes of the methods in the foregoing embodiments may be implemented by a computer program instructing relevant hardware, the computer program may be stored in a computer-readable storage medium, and when the program is run, the processes of the methods in the foregoing embodiment may be performed. The storage medium may be a magnetic disk, an optical disk, a Read-Only Memory (ROM), or a Random Access Memory (RAM), etc.

What is disclosed above is merely exemplary embodiments of this disclosure, and is certainly not intended to limit the scope of the claims of this disclosure. Therefore, equivalent variations made in accordance with the claims of this disclosure shall fall within the scope of this disclosure.

What is claimed is:

1. A data processing method, performed by a computer device, the method comprising:
   acquiring M candidate quantized state chains of a transform block in multimedia data, the M candidate quantized state chains being determined according to a quantized state of a transform coefficient in the transform block, and M being a positive integer;
   acquiring N syntax elements corresponding to a transform coefficient i in the transform block, and acquiring fixed probability models respectively corresponding to K syntax elements among the N syntax elements, i being less than or equal to a quantity of transform coefficients in the transform block, i, N and K being all positive integers, and K being less than N;
   performing context modeling for (N-K) syntax elements according to adjacent coding coefficients of the transform coefficient i, to obtain target probability models respectively corresponding to the (N-K) syntax elements;
   determining a coefficient rate distortion cost of the transform coefficient i according to pre-coding results of pre-coding the K syntax elements with the fixed probability models, pre-coding results of pre-coding the (N-K) syntax elements with the target probability models, and a quantization reconstruction value corresponding to the transform coefficient i; and
   determining path rate distortion costs respectively corresponding to the M candidate quantized state chains according to a coefficient rate distortion cost of the transform coefficient in the transform block.

2. The method according to claim 1, wherein the multimedia data comprises a video frame image, and the method further comprises:
   acquiring the video frame image, and dividing the video frame image according to unit allocation information of the video frame image, to obtain at least two pixel regions; and
   determining the transform block from the at least two pixel regions according to a coding order of the at least two pixel regions.

3. The method according to claim 1, wherein the acquiring the M candidate quantized state chains of the transform block in the multimedia data comprises:
   acquiring the transform coefficient i and a transform coefficient (i+1) in the transform block of the multimedia data;
   acquiring a quantization value of the transform coefficient i in T quantized states according to a first quantizer and a second quantizer, the first quantizer and the second quantizer respectively comprising T/2 quantized states, and T being a positive integer greater than 1;

determining a subsequent quantized state corresponding to a quantized state of the transform coefficient i according to parity of the quantization value of the transform coefficient i, and determining the subsequent quantized state as a quantized state of the transform coefficient (i+1), the subsequent quantized state belonging to the T quantized states; and generating the M candidate quantized state chains of the transform block according to the quantized state of the transform coefficient i and the quantized state of the transform coefficient (i+1).

4. The method according to claim 3, wherein the determining the coefficient rate distortion cost of the transform coefficient i according to the pre-coding results of pre-coding the K syntax elements comprises:

acquiring a bit rate loss of the transform coefficient i in T quantized states according to the pre-coding results of pre-coding the K syntax elements with the fixed probability models and the pre-coding results of pre-coding the (N-K) syntax elements with the target probability models, T being a positive integer greater than 1;

acquiring the quantization reconstruction value corresponding to the transform coefficient i through the first quantizer and the second quantizer, and determining a distortion loss of the transform coefficient i in the T quantized states according to the transform coefficient i and the quantization reconstruction value; and determining the coefficient rate distortion cost of the transform coefficient i in the T quantized states according to the distortion loss and the bit rate loss.

5. The method according to claim 4, wherein the acquiring the bit rate loss of the transform coefficient i in T quantized states according to the pre-coding results of pre-coding the K syntax elements with the fixed probability models and the pre-coding results of pre-coding the (N-K) syntax elements with the target probability models comprises:

pre-coding the K syntax elements of the transform coefficient i in the quantized states with the fixed probability models, to obtain the pre-coding results respectively corresponding to the K syntax elements;

pre-coding the (N-K) syntax elements of the transform coefficient i in the T quantized states with the target probability models, to obtain the pre-coding results respectively corresponding to the (N-K) syntax elements; and acquiring the bit rate loss of the transform coefficient i in the T quantized states according to the pre-coding results respectively corresponding to the K syntax elements and the pre-coding results respectively corresponding to the (N-K) syntax elements.

6. The method according to claim 1, wherein the acquiring the N syntax elements corresponding to the transform coefficient i in the transform block, and acquiring the fixed probability models respectively corresponding to the K syntax elements among the N syntax elements comprise:

acquiring K syntax elements carrying pre-configured model identifiers from the N syntax elements; and acquiring a first probability model set respectively corresponding to the K syntax elements in the T quantized states of the transform coefficient i, and determining, in the first probability model set, probability models matching the pre-configured model identifiers as the fixed probability models respectively corresponding to the K syntax elements, T being a positive integer greater than 1.

7. The method according to claim 1, wherein the performing the context modeling for the (N-K) syntax elements according to the adjacent coding coefficients of the transform coefficient i comprises:

acquiring, in the multimedia data, the adjacent coding coefficients of the transform coefficient i in a target quantized state and acquiring (N-K) coded syntax elements corresponding to the adjacent coding coefficients, the target quantized state belonging to the T quantized states, T being a positive integer greater than 1;

acquiring, in the target quantized state, a second probability model set respectively corresponding to the (N-K) syntax elements of the transform coefficient i; and allocating the target probability models to the (N-K) syntax elements of the transform coefficient i from the second probability model set according to the (N-K) coded syntax elements corresponding to the adjacent coding coefficients.

8. The method according to claim 7, wherein the allocating the target probability models to the (N-K) syntax elements of the transform coefficient i from the second probability model set according to the (N-K) coded syntax elements corresponding to the adjacent coding coefficients comprises:

acquiring coding reconstruction absolute values corresponding to the adjacent coding coefficients according to the (N-K) coded syntax elements corresponding to the adjacent coding coefficients, and acquiring a global reconstruction cumulative value and a local reconstruction cumulative value corresponding to the adjacent coding coefficients according to the coding reconstruction absolute values;

acquiring a quantity of non-zero values in the transform block, acquiring a horizontal coordinate and a vertical coordinate of the transform coefficient i in the transform block, and determining a sum of the horizontal coordinate and the vertical coordinate as a diagonal position corresponding to the transform coefficient i; and allocating the target probability models to the (N-K) syntax elements of the transform coefficient i from the second probability model set according to the global reconstruction cumulative value, the local reconstruction cumulative value, the quantity of non-zero values and the diagonal position.

9. The method according to claim 1, wherein the determining the path rate distortion costs respectively corresponding to the M candidate quantized state chains comprises:

acquiring the coefficient rate distortion cost of each transform coefficient in the transform block; and accumulating coefficient rate distortion costs respectively associated with each of the M candidate quantized state chains to obtain the path rate distortion costs respectively corresponding to the M candidate quantized state chains.

10. The method according to claim 1, wherein the method further comprises:

determining a candidate quantized state chain corresponding to the smallest path rate distortion cost as a target quantized state chain of the transform block;

traversing the transform coefficients contained in the transform block according to the target quantized state chain, to obtain a coefficient quantization value respectively corresponding to each transform coefficient in the transform block; and performing entropy coding processing on the coefficient quantization value to obtain a coded bit stream corresponding to the transform block and outputting the coded bit stream to a decoding end.

11. A data processing method, comprising:

acquiring M candidate quantized state chains of a transform block in multimedia data, the M candidate quantized state chains being determined according to a quantized state of a transform coefficient in the transform block, and M being a positive integer;

acquiring N syntax elements corresponding to a transform coefficient i in the transform block, and acquiring fixed probability models respectively corresponding to the N syntax elements, i being less than or equal to a quantity of transform coefficients in the transform block, and i and N being positive integers;

determining a coefficient rate distortion cost of the transform coefficient i according to pre-coding results of pre-coding the N syntax elements with the fixed probability models and a quantization reconstruction value corresponding to the transform coefficient i; and determining path rate distortion costs respectively corresponding to the M candidate quantized state chains according to a coefficient rate distortion cost of each transform coefficient in the transform block.

12. A data processing apparatus, the apparatus comprising:

a memory operable to store computer-readable instructions; and a processor circuitry operable to read the computer-readable instructions, the processor circuitry when executing the computer-readable instructions is configured to:

acquire M candidate quantized state chains of a transform block in multimedia data, the M candidate quantized state chains being determined according to a quantized state of a transform coefficient in the transform block, and M being a positive integer;

acquire N syntax elements corresponding to a transform coefficient i in the transform block, and acquire fixed probability models respectively corresponding to K syntax elements among the N syntax elements, i being less than or equal to a quantity of transform coefficients in the transform block, i, N and K being all positive integers, and K being less than N;

perform context modeling for (N-K) syntax elements according to adjacent coding coefficients of the transform coefficient i, to obtain target probability models respectively corresponding to the (N-K) syntax elements;

determine a coefficient rate distortion cost of the transform coefficient i according to pre-coding results of pre-coding the K syntax elements with the fixed probability models, pre-coding results of pre-coding the (N-K) syntax elements with the target probability models, and a quantization reconstruction value corresponding to the transform coefficient i; and determine path rate distortion costs respectively corresponding to the M candidate quantized state chains according to a coefficient rate distortion cost of the transform coefficient in the transform block.

13. The apparatus according to claim 12, wherein the multimedia data comprises a video frame image, and the processor circuitry is further configured to:

acquire the video frame image, and divide the video frame image according to unit allocation information of the video frame image, to obtain at least two pixel regions; and determine the transform block from the at least two pixel regions according to a coding order of the at least two pixel regions.

14. The apparatus according to claim 12, wherein the processor circuitry is configured to:

acquire the transform coefficient i and a transform coefficient (i+1) in the transform block of the multimedia data;

acquire a quantization value of the transform coefficient i in T quantized states according to a first quantizer and a second quantizer, the first quantizer and the second quantizer respectively comprising T/2 quantized states, and T being a positive integer greater than 1;

determine a subsequent quantized state corresponding to a quantized state of the transform coefficient i according to parity of the quantization value of the transform coefficient i, and determine the subsequent quantized state as a quantized state of the transform coefficient (i+1), the subsequent quantized state belonging to the T quantized states; and generate the M candidate quantized state chains of the transform block according to the quantized state of the transform coefficient i and the quantized state of the transform coefficient (i+1).

15. The apparatus according to claim 14, wherein the processor circuitry is configured to:

acquire a bit rate loss of the transform coefficient i in T quantized states according to the pre-coding results of pre-coding the K syntax elements with the fixed probability models and the pre-coding results of pre-coding the (N-K) syntax elements with the target probability models, T being a positive integer greater than 1;

acquire the quantization reconstruction value corresponding to the transform coefficient i through the first quantizer and the second quantizer, and determine a distortion loss of the transform coefficient i in the T quantized states according to the transform coefficient i and the quantization reconstruction value; and determine the coefficient rate distortion cost of the transform coefficient i in the T quantized states according to the distortion loss and the bit rate loss.

16. The apparatus according to claim 15, wherein the processor circuitry is configured to:

pre-code the K syntax elements of the transform coefficient i in the quantized states with the fixed probability models, to obtain the pre-coding results respectively corresponding to the K syntax elements;

pre-code the (N-K) syntax elements of the transform coefficient i in the T quantized states with the target probability models, to obtain the pre-coding results respectively corresponding to the (N-K) syntax elements; and acquire the bit rate loss of the transform coefficient i in the T quantized states according to the pre-coding results respectively corresponding to the K syntax elements and the pre-coding results respectively corresponding to the (N-K) syntax elements.

17. The apparatus according to claim 12, wherein the processor circuitry is configured to:

acquire K syntax elements carrying pre-configured model identifiers from the N syntax elements; and acquire a first probability model set respectively corresponding to the K syntax elements in the T quantized states of the transform coefficient i, and determine, in the first probability model set, probability models matching the pre-configured model identifiers as the fixed probability models respectively corresponding to the K syntax elements, T being a positive integer greater than 1.

18. The apparatus according to claim 12, wherein the processor circuitry is configured to:
   acquire, in the multimedia data, the adjacent coding coefficients of the transform coefficient i in a target quantized state and acquiring (N-K) coded syntax elements corresponding to the adjacent coding coefficients, the target quantized state belonging to the T quantized states, T being a positive integer greater than 1;
   acquire, in the target quantized state, a second probability model set respectively corresponding to the (N-K) syntax elements of the transform coefficient i; and
   allocate the target probability models to the (N-K) syntax elements of the transform coefficient i from the second probability model set according to the (N-K) coded syntax elements corresponding to the adjacent coding coefficients.

19. The apparatus according to claim 18, wherein the processor circuitry is configured to:
   acquire coding reconstruction absolute values corresponding to the adjacent coding coefficients according to the (N-K) coded syntax elements corresponding to the adjacent coding coefficients, and acquire a global reconstruction cumulative value and a local reconstruction cumulative value corresponding to the adjacent coding coefficients according to the coding reconstruction absolute values;
   acquire a quantity of non-zero values in the transform block, acquire a horizontal coordinate and a vertical coordinate of the transform coefficient i in the transform block, and determine a sum of the horizontal coordinate and the vertical coordinate as a diagonal position corresponding to the transform coefficient i; and
   allocate the target probability models to the (N-K) syntax elements of the transform coefficient i from the second probability model set according to the global reconstruction cumulative value, the local reconstruction cumulative value, the quantity of non-zero values and the diagonal position.

20. The apparatus according to claim 12, wherein the processor circuitry is configured to:
   acquire the coefficient rate distortion cost of each transform coefficient in the transform block; and
   accumulate coefficient rate distortion costs respectively associated with each of the M candidate quantized state chains to obtain the path rate distortion costs respectively corresponding to the M candidate quantized state chains.

\* \* \* \* \*